(12) United States Patent
Ceder et al.

(10) Patent No.: US 12,703,645 B2
(45) Date of Patent: Aug. 11, 2026

(54) LI-RICH CATHODE MATERIALS EXHIBITING NON-TOPOTACTIC REACTIONS AND COMPONENTS INCORPORATING SAME

(71) Applicant: THE REGENTS OF THE UNIVERSITY OF CALIFORNIA, Oakland, CA (US)

(72) Inventors: Gerbrand Ceder, Oakland, CA (US); Jianping Huang, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 439 days.

(21) Appl. No.: 18/268,566

(22) PCT Filed: Dec. 22, 2021

(86) PCT No.: PCT/US2021/073086
§ 371 (c)(1),
(2) Date: Jun. 20, 2023

(87) PCT Pub. No.: WO2022/140790
PCT Pub. Date: Jun. 30, 2022

(65) Prior Publication Data

US 2024/0308873 A1 Sep. 19, 2024

Related U.S. Application Data

(60) Provisional application No. 63/129,991, filed on Dec. 23, 2020.

(51) Int. Cl.
*C01G 53/50* (2025.01)
*C01G 45/1228* (2025.01)
(Continued)

(52) U.S. Cl.
CPC ......... *C01G 53/50* (2013.01); *C01G 45/1228* (2013.01); *H01M 4/485* (2013.01);
(Continued)

(58) Field of Classification Search
CPC ...... H01M 4/485; H01M 4/505; H01M 4/525; C01G 53/50; C01G 45/1228; C01P 2002/72; C01P 2002/76; C01P 2002/77
(Continued)

(56) References Cited

U.S. PATENT DOCUMENTS 9,780,363 B2 10/2017 Ceder et al.
9,960,417 B2 5/2018 Ceder et al.
(Continued)

FOREIGN PATENT DOCUMENTS

CN 111211319 A * 5/2020 ............. C01G 53/82
EP 3136478 A1 3/2017

OTHER PUBLICATIONS

Translation of CN-111211319-A (Year: 2020).*
(Continued)

*Primary Examiner* — Tri V Nguyen
(74) *Attorney, Agent, or Firm* — Womble Bond Dickinson (US) LLP

(57) ABSTRACT

This disclosure provides systems, methods, apparatus, and compositions of matter related to lithium-ion batteries. In one aspect, a lithium metal oxide has a general formula $Li_{1+x}(MM')_{1-x-y}D_yO_2$. M is a redox-active transition metal, M' is a redox-inactive transition metal, and D is a metal dopant selected from a group consisting of V, Cr, Fe, and Mo. D is not M or M', and M is not M'. $0<x\leq 0.2$ and $0<y\leq 0.2$. The lithium metal oxide has a cation-disordered rocksalt structure.

20 Claims, 19 Drawing Sheets

(51) Int. Cl.
*H01M 4/02* (2006.01)
*H01M 4/485* (2010.01)

(52) U.S. Cl.
CPC ...... *C01P 2002/50* (2013.01); *C01P 2002/72* (2013.01); *C01P 2002/76* (2013.01); *C01P 2002/77* (2013.01); *C01P 2006/40* (2013.01); *H01M 2004/028* (2013.01)

(58) Field of Classification Search
USPC ....................................................... 252/182.1
See application file for complete search history.

(56) References Cited

U.S. PATENT DOCUMENTS

| | | | | |
|---|---|---|---|---|
| 10,280,092 | B2 | 5/2019 | Carroll et al. | |
| 10,957,901 | B2 | 3/2021 | Ceder et al. | |
| 11,099,449 | B1 * | 8/2021 | Giaquinta ............. | G02F 1/1525 |
| 2014/0099549 | A1 * | 4/2014 | Ceder ................... | H01M 4/624 429/231.95 |

OTHER PUBLICATIONS

Huang et al. “Non-topotactic reactions enable high rate capability in Li-rich cathode materials.” Nature Energy, Jul. 2021, vol. 6, pp. 706-714, located at https://doi.org/10.1038/s41560-021-00817-6.

Bréger, J. et al. Effect of high voltage on the structure and electrochemistry of LiNi0.5Mn0.5O2; a joint experimental and theoretical study. Chem. Mater. 18, 4768-4781 (2006).

Li, H. H. et al. Changes in the cation ordering of layered O3 LiNi0.5Mn0.5O2 during electrochemical cycling to high voltages: an electron diffraction study. Chem. Mater. 19, 2551-2565 (2007).

Jones, C. D. W., Rossen, E. & Dahn, J. R. Structure and electrochemistry of LixCryC1-yO2. Solid State Ion. 68. 65-69 (1994).

Lyu, Y. et al. Atomic insight into electrochemical inactivity of lithium chromate (LiCrO2): irreversible migration of chromium into lithium layers in surface regions. J. Power Sources 273, 1218-1225 (2015).

Lee, J. et al. Unlocking the potential of cation-disordered oxides for rechargeable lithium batteries. Science 343, 519-522 (2014).

Clément, R. J., Lun, Z. & Ceder, G. Cation-disordered rocksalt transition metal oxides and oxyfluorides for high energy lithium-ion cathodes. Energy Environ. Sci. 13, 345-373 (2020).

Van Der Ven, A. & Ceder, G. Lithium diffusion mechanisms in layered intercalation compounds. J. Power Sources 97-98, 529-531 (2001).

Van Der Ven, A. Lithium diffusion in layered LiXCoO. Electrochem. Solid-State Lett. 3, 301 (1999).

Urban, A., Lee, J. & Cedar, G. The configurational space of rocksalt-type oxides for high-capacity lithium battery electrodes. Adv. Energy Mater. 4, 1400478 (2014).

Nakajima, M. & Yabuuchi, N. Lithium-excess cation-disordered rocksalt-type oxide with nanoscale phase segregation: Li1-25Nb0-25V0.5O2. Chem. Mater. 29, 6927-6935 (2017).

Sun, X., Duffort, V, Mehdi, B. L., Browning, N. D. & Nazar, L. F. Investigation of the mechanism of Mg insertion in birnessite in nonaqueous and aqueous rechargeable Mg-ion batteries. Chem. Mater. 28, 534-542 (2016).

International Search Report and Written Opinion of Application No. PCT/US2021/073086, mailed Jun. 5, 2022, 6 pages.

Jinhyuk Lee et al: “Mitigating oxygen loss to improve the cycling performance of high capacity cation-disordered cathode materials”, Nature Communications, vol. 8, No. 1, Oct. 17, 2017 (Oct. 17, 2017), XP055522547, DOI: 10.1038/s41467-017-01115-0.

Jinhyuk Lee et al: “A new class of high capacity cation-disordered oxides for rechargeable lithium batteries: Li– ;Ni– ;Ti– ;Mo oxides”, Energy & Environmental Science, vol. 8, No. 11, Jan. 1, 2015 (Jan. 1, 2015), pp. 3255-3265, XP055522721, Cambridge ISSN: 1754-5692, DOI: 10.1039/C5EE02329G.

Naoaki Yabuuchi et al: “High-capacity electrode materials for rechargeable lithium batteries: Li 3 NbO 4-based system with cation-disordered rocksalt structure”, Proceedings of the National Academy of Sciences, vol. 112, No. 25, Jun. 23, 2015 (Jun. 23, 2015), pp. 7650-7655, XP055307499, ISSN: 0027-8424, DOI: 10.1073/ponas.1504901112.

* cited by examiner

LI-RICH CATHODE MATERIALS EXHIBITING NON-TOPOTACTIC REACTIONS AND COMPONENTS INCORPORATING SAME

RELATED APPLICATIONS

This application claims priority to International Patent Application Ser. No. PCT/US2021/073086, filed Dec. 22, 2021, which claims priority to and the benefit to United States Provisional Patent Application No. 63/129,991, filed on Dec. 23, 2020, and entitled "LI-RICH CATHODE MATERIALS EXHIBITING NON-TOPOTACTIC REACTIONS", the content of which is incorporated herein by reference in its entirety.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to lithium-ion batteries and more particularly to lithium-ion battery cathode materials.

BACKGROUND

The need for novel ideas for Li-ion batteries with high energy and high power is becoming increasingly important as society enters a new electrified era. The operation of a Li-ion battery requires the shuttling of $Li^+$ ions in and out of electrode materials. To support fast Li transport, a perfect topotactic reaction, whereby the host material remains unchanged as its Li content changes, is generally considered important because of the minimal disruption to Li-transport pathways.

In some electrode materials with large capacity, transport of other ionic species besides Li can also occur, leading to a change in the material's structure. The transport of multiple ionic species not only increases the kinetic complexities, but also affects the Li-transport pathways, which is why such non-topotactic reactions are usually not sought out. For example, a large mismatch in the ionic mobilities of the Li and other mobile ionic species can lead to voltage hysteresis. In conversion-type electrode materials (e.g., $FeF_2$, $CuF_2$, FeOF, $Fe_3O_4$), sluggish transition-metal (TM) or anion migration limits the redox reaction kinetics and induces voltage hysteresis >1 V.

Non-topotactic reactions may be observed in some intercalation-type electrode materials when TM cations have some mobility. However, non-topotactic reactions have typically resulted in poor electrochemical performance, thereby rendering it undesirable. For example, voltage relaxation from 5.2 to 4.5 V occurs in layered $LiNi_{0.5}Mn_{0.5}O_2$ at the top of charge because of sluggish Ni migration, and the slow TM motion limits the usable amount of Li that can be inserted at low voltages, thereby resulting in poor rate performance. Similarly, poor electrochemical performance in layered $LiCrO_2$ has been attributed to blocked Li diffusion because of Cr migration, even though $LiCrO_2$ shows a high degree of structural similarity to $LiCoO_2$, an extensively commercialized battery electrode material.

Hence, a general design principle for high-power cathode materials has been to pursue a perfect topotactic reaction to maintain the structural framework and minimize kinetic complexities. $LiFePO_4$ and spinel $LiMn_2O_4$ are successful examples of this approach. This strategy may have come to an end as the only cations that have virtually no mobility in dense oxides are those used in the currently used NMC layered oxides, and discovery of new large-capacity cathode materials will require one to manage the mobility of the non-working cations. While polyanion systems are generally better at fixing a metal in place, they tend to have low energy density, and as such are unlikely to spur further energy density improvements.

SUMMARY

High-rate cathode materials for Li-ion batteries require fast Li-transport kinetics, which typically rely on topotactic Li intercalation/de-intercalation, because it minimally disrupts Li-transport pathways. In contrast to this conventional view, the present disclosure provides for a significantly improved rate capability in a Li-rich cation-disordered rock-salt (DRX) cathode by, in part, replacing the topotactic reaction with a non-topotactic reaction. The fast non-topotactic lithiation reaction is enabled by facile and reversible transition-metal (TM) octahedral-to-tetrahedral migration, which improves rather than impedes Li transport, thereby achieving a high-rate performance in Mn- and Ni-based DRX materials when some of the TM content can reversibly switch between octahedral and tetrahedral sites. The present disclosure relates to high-performance cathode materials and methods of making same that leverage the interplay between Li and TM migration in materials to enable fast non-topotactic Li intercalation/de-intercalations.

Innovative aspects of the subject matter described herein can be implemented in compositions of matter, methods of making the compositions of matter, a positive electrode material including one of the compositions of matter, and an energy storage device (e.g., a lithium-ion battery) including one of the compositions of matter.

The present disclosure includes, without limitation, the following example implementations.

Embodiment 1: A lithium metal oxide comprising a cation-disordered rocksalt structure comprising a general formula of $Li_{1+x}(MM')_{1-x-y}D_yO_2$, wherein M is a redox-active transition metal; M' is a redox-inactive transition metal; D is a metal dopant selected from a group consisting of vanadium (V), chromium (Cr), iron (Fe), and molybdenum (Mo), wherein D is not M or M', M is not M', $0<x\leq 0.2$, and $0<y\leq 0.2$.

Embodiment 2: A lithium metal oxide comprising a cation-disordered rocksalt structure comprising a general formula of $Li_{1.2}(MM')_{0.8-x}D_xO_2$, wherein M is a redox-active transition metal, such as manganese (Mn) or nickel (Ni); M' is a redox-inactive transition metal, such as titanium (Ti); D is a metal dopant selected from a group consisting of V, Cr, Fe, and Mo, wherein D is not M or M', M is not M', and $0<x\leq 0.2$.

Embodiment 3: The lithium metal oxide of any of Embodiments 1 or 2, or any combination thereof, wherein M is selected from the group consisting of Ni, Mn, Fe, cobalt (Co), V, Cr, tungsten (W), and Mo.

Embodiment 4: The lithium metal oxide of any of Embodiments 1 to 3, or any combination thereof, wherein M' is selected from the group consisting of Ti, zirconium (Zr), niobium (Nb), tantalum (Ta), W, and Mo.

Embodiment 5: The lithium metal oxide of any of Embodiments 1 to 4, or any combination thereof, wherein the lithium metal oxide comprises a general formula of $Li_{1.2}(MM')_{0.8-y}D_yO_2$.

Embodiment 6: The lithium metal oxide of any of Embodiments 1 to 5, or any combination thereof, wherein D is Cr.

Embodiment 7: The lithium metal oxide of any of Embodiments 1 to 6, or any combination thereof, wherein the lithium metal oxide comprises a composition of $Li_{1.2}Mn_{0.4-x}Ti_{0.4}D_xO_2$, wherein $0<x\leq0.2$.

Embodiment 8: The lithium metal oxide of any of Embodiments 1 to 7, or any combination thereof, wherein the lithium metal oxide comprises a composition of $Li_{1.2}Mn_{0.3}Ti_{0.4}Cr_{0.1}O_2$ (LMTC01O).

Embodiment 9: The lithium metal oxide of any of Embodiments 1 to 8, or any combination thereof, wherein the lithium metal oxide comprises a composition of $Li_{1.2}Mn_{0.2}Ti_{0.4}Cr_{0.2}O_2$ (LMTC02O).

Embodiment 10: The lithium metal oxide of any of Embodiments 1 to 9, or any combination thereof, wherein the lithium metal oxide comprises a composition of $Li_{1.2}Ni_{0.2-x}Ti_{0.6-x}D_{2x}O_2$, wherein $0<x\leq0.1$.

Embodiment 11: The lithium metal oxide of any of Embodiments 1 to 10, or any combination thereof, wherein the lithium metal oxide comprises a composition of $Li_{1.2}Ni_{0.1}Ti_{0.5}Cr_{0.2}O_2$ (LNTC02O).

Embodiment 12: A method for manufacturing a lithium metal oxide comprising a cation-disordered rocksalt structure having a general formula of $Li_{1+x}(MM')_{1-x-y}D_yO_2$, wherein M is a redox-active transition metal, M' is a redox-inactive transition metal, D is a metal dopant selected from a group consisting of V, Cr, Fe, and Mo, wherein D is not M or M', M is not M', $0<x\leq0.2$, and $0<y\leq0.2$. The method includes the steps of providing at least one lithium-based precursor, providing a redox-active transition metal-based precursor, providing a redox-inactive transition metal-based precursor, providing a dopant metal-based precursor wherein the metal is D; and mixing the at least one lithium-based precursor, the redox-active transition metal-based precursor, the redox-inactive transition metal-based precursor, and the dopant metal-based precursor to form a mixture.

Embodiment 13: The method for manufacturing a lithium metal oxide of Embodiment 12, wherein M is selected from the group consisting of Ni, Mn, Fe, Co, V, Cr, W, and Mo.

Embodiment 14: The method for manufacturing a lithium metal oxide of any of Embodiments 12 or 13, or any combination thereof, wherein M' is selected from the group consisting of Ti, Zr, Nb, Ta, W, and Mo.

Embodiment 15: The method for manufacturing a lithium metal oxide of any of Embodiments 12 to 14, or any combination thereof, wherein the redox-active transition metal-based precursor is selected from the group consisting of NiO, $Ni_2O_3$, $MnO_2$, MnO, $Mn_2O_3$, FeO, $Fe_2O_3$, $Co_2O_3$, $V_2O_3$, $VO_2$, $Cr_2O_3$, $W_2O_3$, $MoO_3$, $MoO_2$, and $Mo_2O_3$ and the redox-inactive transition metal-based precursor is selected from the group consisting of $TiO_2$, $ZrO_2$, $Nb_2O_5$, $Ta_2O_5$, $WO_3$, and $MoO_3$, $MoO_2$, and $Mo_2O_3$.

Embodiment 16: The method for manufacturing a lithium metal oxide of any of Embodiments 12 to 15, or any combination thereof, wherein the at least one lithium-based precursor is selected from the group consisting of $Li_2CO_3$, LiOH, $Li_2O$, $Li_2SO_4$, LiCl, $LiNO_3$, and combinations thereof.

Embodiment 17: The method for manufacturing a lithium metal oxide of any of Embodiments 12 to 16, or any combination thereof, wherein the dopant metal-based precursor is selected from the group consisting of $V_2O_3$, $VO_2$, $Cr_2O_3$, FeO, $Fe_2O_3$, $MoO_3$, $MoO_2$, and $Mo_2O_3$.

Embodiment 18: The method for manufacturing a lithium metal oxide of any of Embodiments 12 to 17, or any combination thereof, wherein stoichiometric amounts of the at least one lithium-based precursor, the redox-active transition metal-based precursor, the redox-inactive transition metal-based precursor, and the dopant metal-based precursor are mixed, and wherein the at least one lithium-based precursor is added in up to about 15% excess of a specified lithium composition.

Embodiment 19: The method for manufacturing a lithium metal oxide of any of Embodiments 12 to 18, or any combination thereof, wherein the mixing comprises ball milling.

Embodiment 20: The method for manufacturing a lithium metal oxide of any of Embodiments 12 to 19, or any combination thereof, further compromising, after the mixing, annealing the mixture at about 700° C. to about 1200° C. for about 1 hours (h) to about 18 hours under an inert atmosphere or in air.

Embodiment 21: The method for manufacturing a lithium metal oxide of any of Embodiments 12 to 20, or any combination thereof, further compromising, after the mixing, annealing the mixture at about 600° C. to about 1400° C., preferably about 700° C. to about 1200° C., and more preferably 900° C. to about 1100° C.

Embodiment 22: The method for manufacturing a lithium metal oxide of any of Embodiments 12 to 21, or any combination thereof, further compromising, after the mixing, annealing the mixture for about 1 h to about 18 h, preferably for about 3 h to about 15 h, and more preferably for about 5 h to about 12 h.

Embodiment 23: An electrode material comprising a lithium metal oxide in accordance with any one of Embodiments of 1 to 11, or combinations thereof.

Embodiment 24: The electrode material of Embodiment 23, further comprising a binder dispersed within the lithium metal oxide.

Embodiment 25: An electrode for an energy storage device, the electrode comprising a substrate and a lithium composition deposited on to the substrate. The lithium composition comprises a lithium metal oxide in accordance with any one of Embodiments of 1-11, or combinations thereof.

Embodiment 26: The electrode of Embodiment 25, wherein the lithium composition further comprises a binder.

Embodiment 27: The electrode of any of Embodiments 25 or 26, or any combination thereof, wherein the substrate comprises a current collector.

Embodiment 28: An energy storage device comprising one or more batteries; where each battery comprises an anode, an electrolyte, and a cathode comprising a lithium metal oxide in accordance with any one of Embodiments of 1-11, or combinations thereof.

Embodiment 29: The energy storage device of Embodiment 28, wherein the cathode comprises an electrode in accordance with any one of Embodiments 25 to 27, or any combination thereof.

Embodiment 30: The energy storage device of Embodiments 28 or 29, or any combination thereof, wherein the one or more batteries comprises a lithium-ion battery.

Embodiment 31: The energy storage device of Embodiments 28 to 30, or any combination thereof, wherein the lithium metal oxide exhibits a non-topotactic reaction during charge and discharge of the lithium-ion battery.

Embodiment 32: The energy storage device of Embodiments 28 to 31, or any combination thereof, further comprising a separator.

Embodiment 33: A method for manufacturing an electrode for an energy storage device, the method comprising providing a lithium composition comprising a lithium metal oxide in accordance with any one of Embodiments of 1-11, or combinations thereof, introducing a binder to the lithium composition, and depositing the lithium composition on to a current collector. The method may include substantially evenly dispersing the binder throughout the composition. Additionally, the lithium composition may be provided as a slurry and may include certain additives.

Embodiment 34: A method for manufacturing an energy storage device, the method comprising assembling a battery by positioning an anode within a cell, positioning a cathode within the cell relative to the anode, positioning a separator within the cell and between the anode and the cathode; and introducing an electrolyte to the cell. The cathode comprises a lithium metal oxide in accordance with any one of Embodiments of 1-11, or combinations thereof.

Embodiment 35: The method of Embodiment 34, wherein the method further comprises assembling a plurality of batteries into a module.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE DRAWINGS

Figures 1A, 1B, 1C:
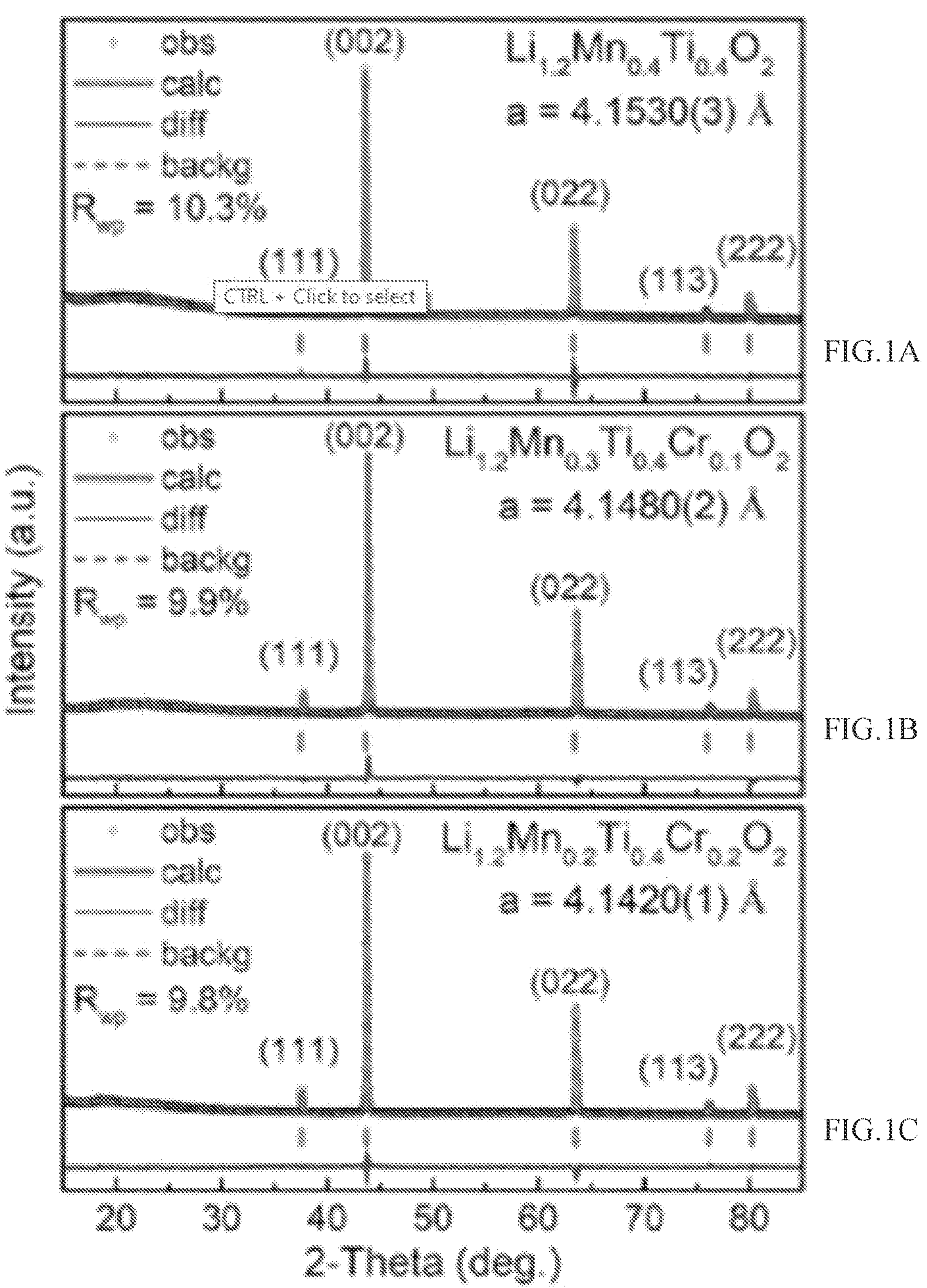
Figures 2A, 2B, 2C, 2D:
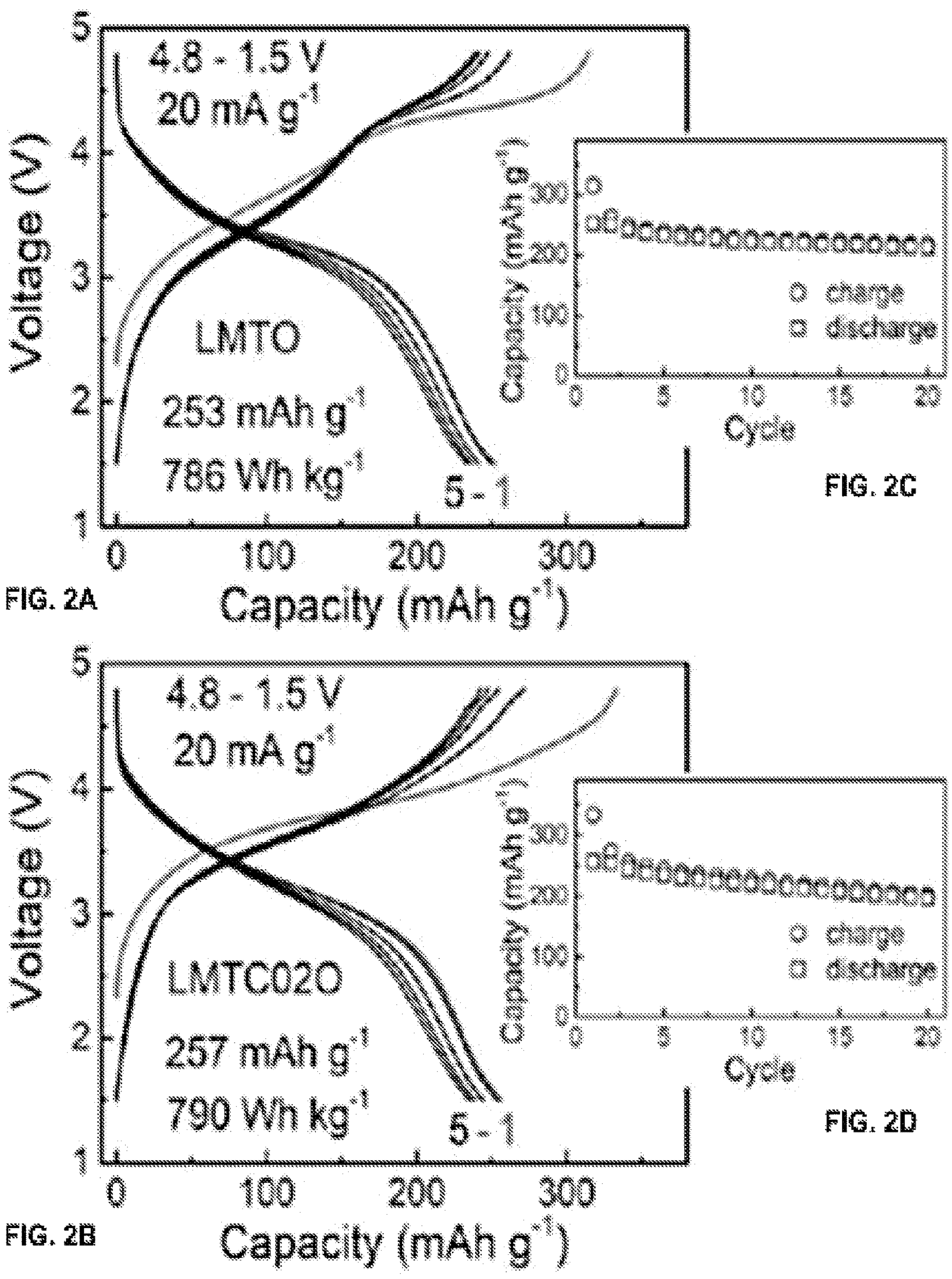
Figure 2E:
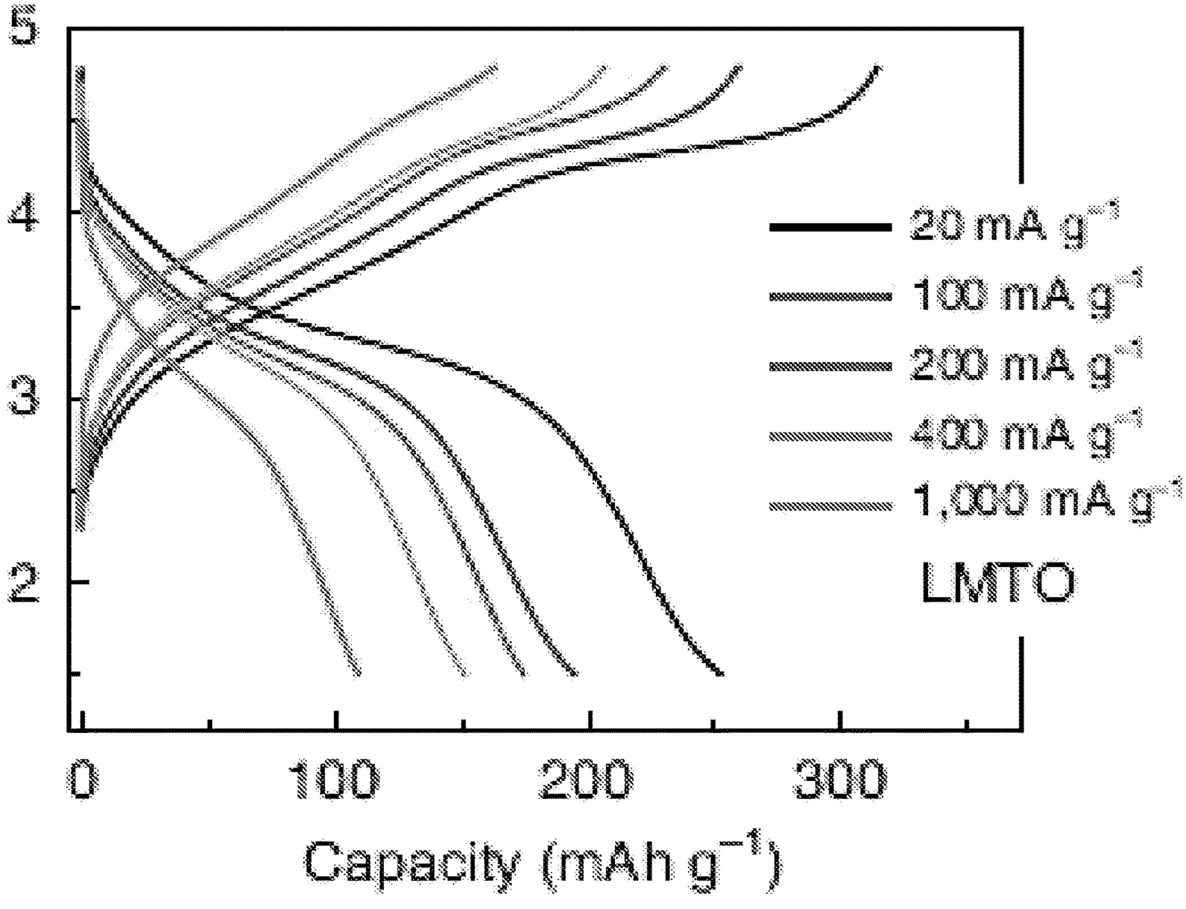
Figure 2F:
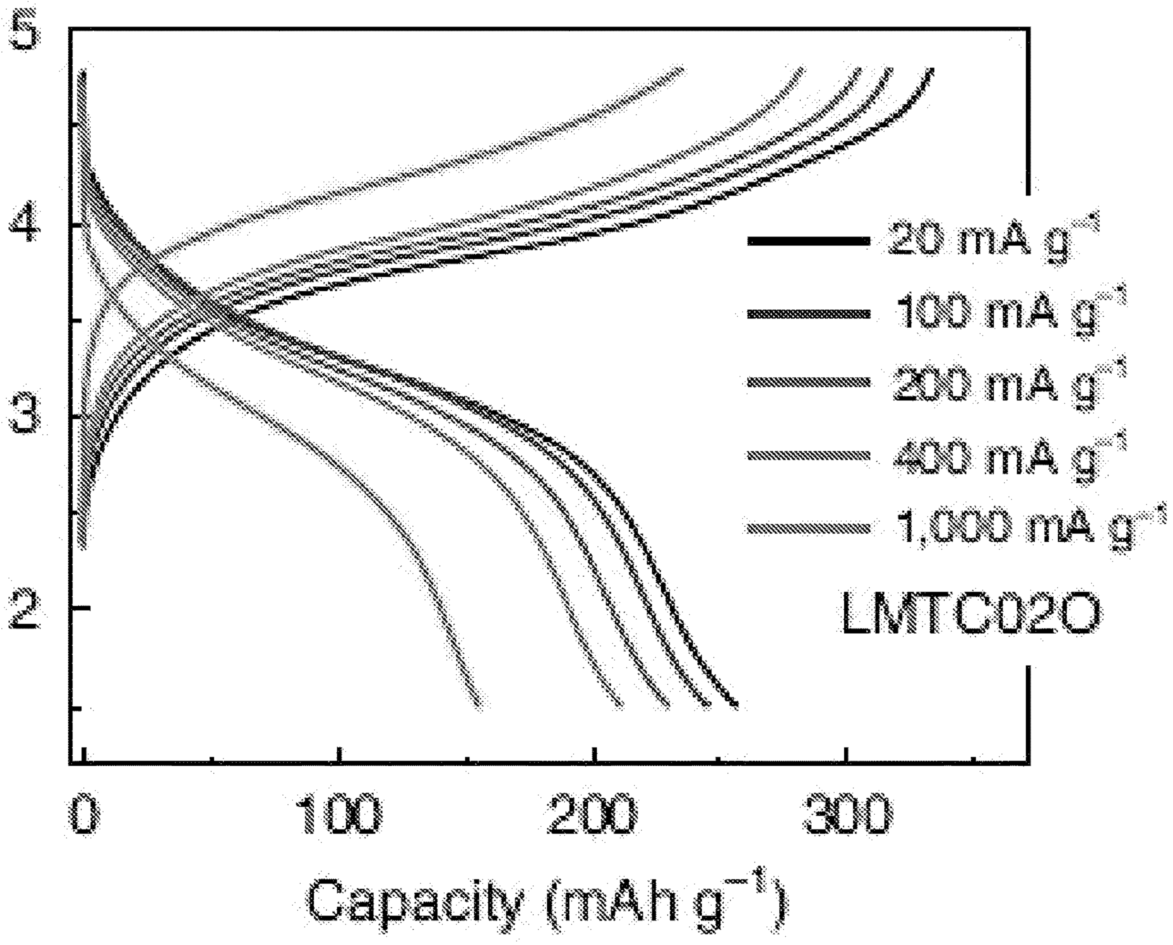
Figures 2G, 2H:
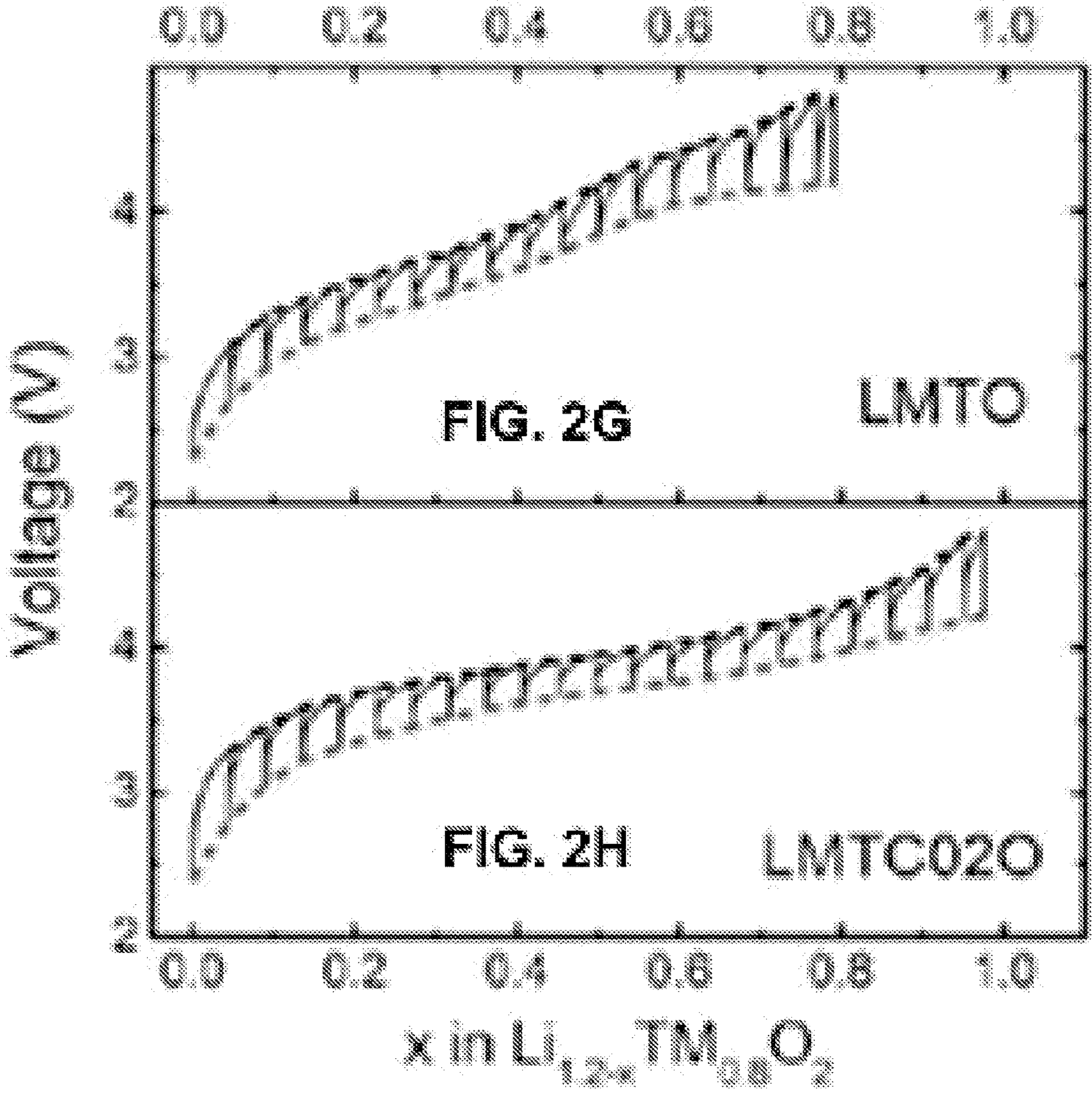
Figure 2I:
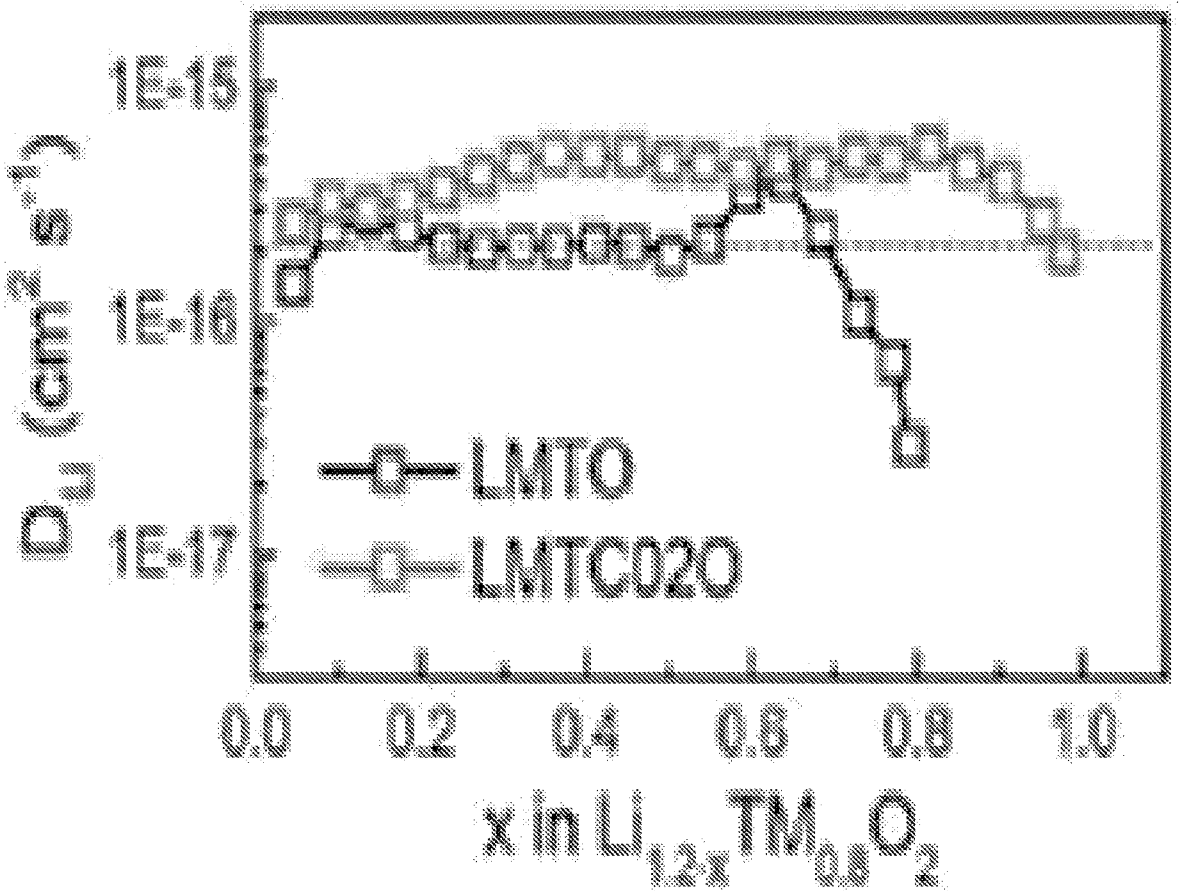
Figure 3A:
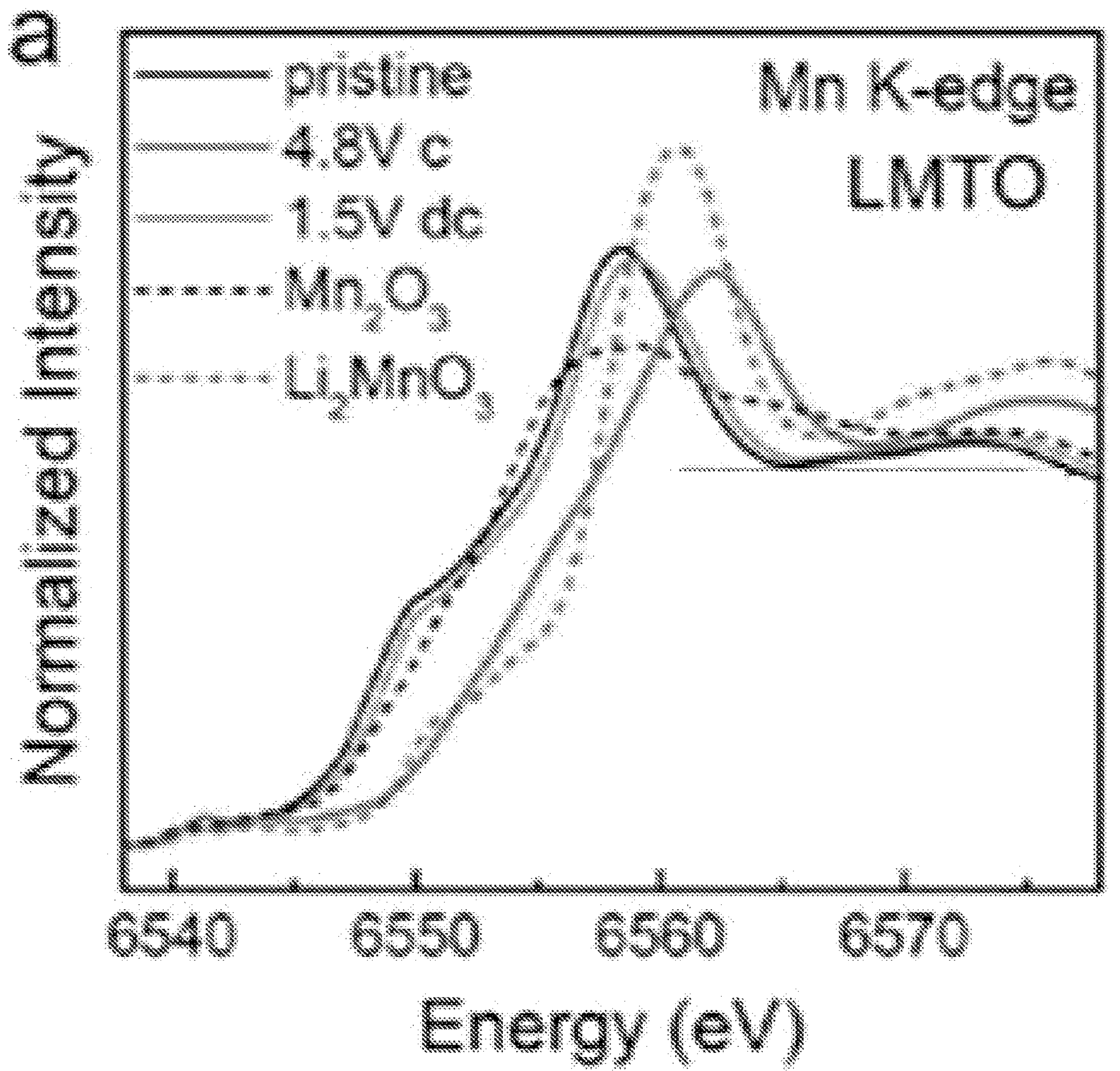
Figure 3B:
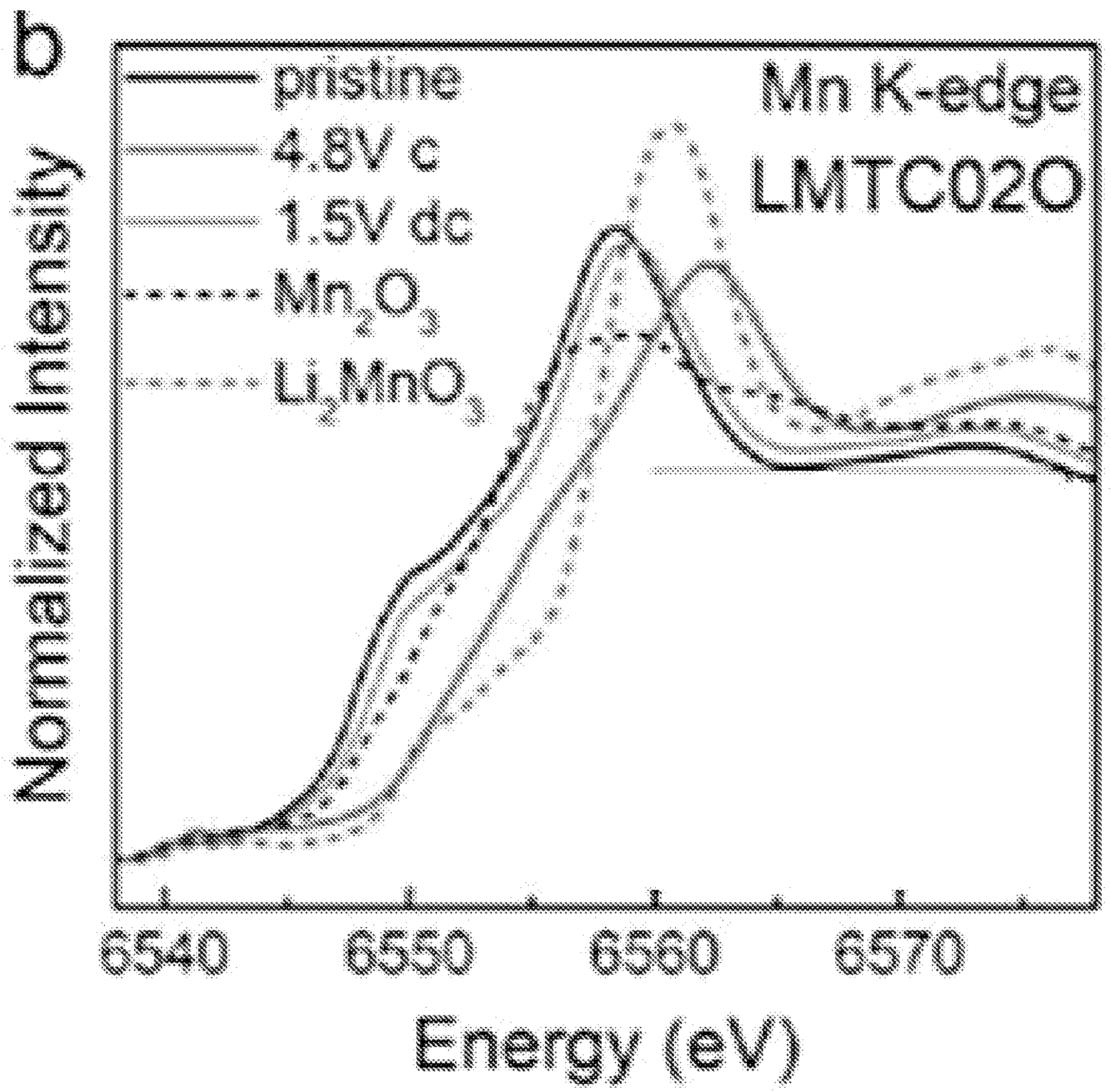
Figure 3C:
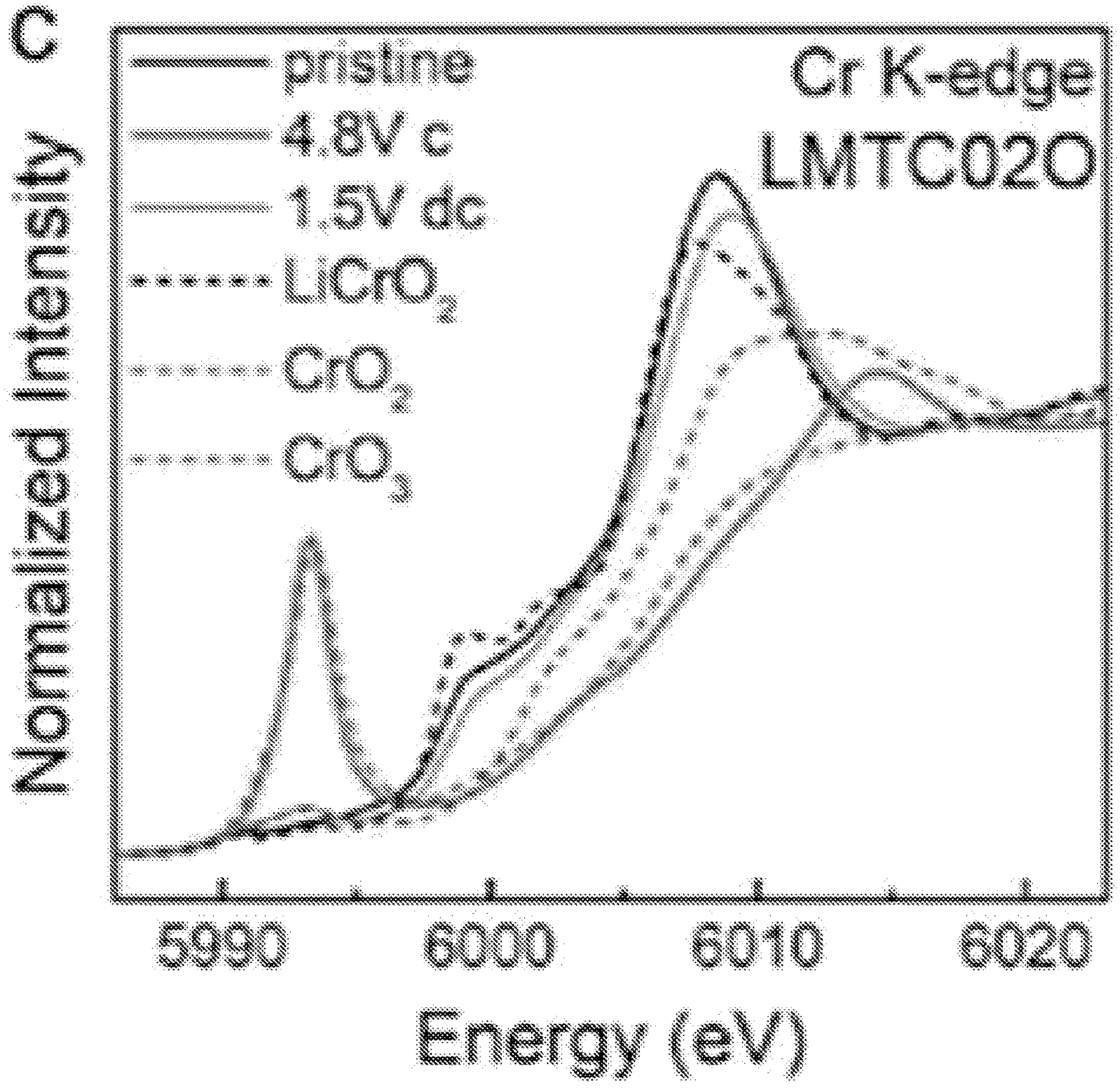
Figure 3D:
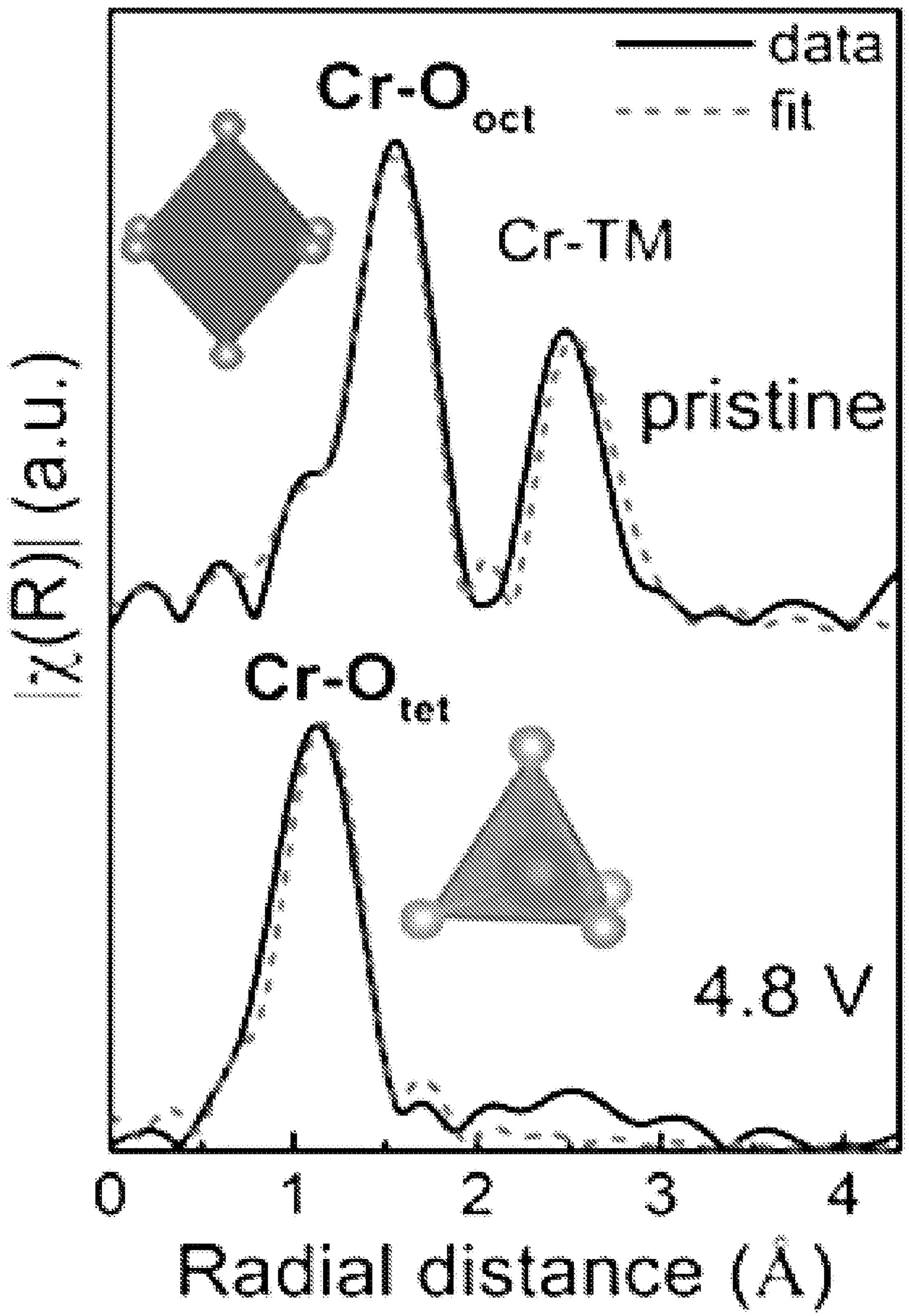

Having thus described the disclosure in the foregoing general terms, reference will now be made to the accompanying drawings, which are not necessarily drawn to scale, and wherein:

FIGS. 1A-1C show the structure characterization of $Li_{1.2}Mn_{0.4-x}Ti_{0.4}Cr_xO_2$-XRD patterns and refinement results in space group Fm-3m in accordance with one or more embodiments of the disclosure, where: FIG. 1A represents $Li_{1.2}Mn_{0.4}Ti_{0.4}O_2$ (LMTO), FIG. 1B represents $Li_{1.2}Mn_{0.3}Ti_{0.4}Cr_{0.1}O_2$ (LMTC01O), and FIG. 1C represents $Li_{1.2}Mn_{0.2}Ti_{0.4}Cr_{0.2}O_2$ (LMTC02O);

FIGS. 2A-2I show the electrochemistry of $Li_{1.2}Mn_{0.4-x}Ti_{0.4}Cr_xO_2$ at room temperature in accordance with one or more embodiments of the disclosure, where: FIGS. 2A and 2B represent voltage profiles of LMTO and LMTC02O, respectively, at 20 mA $g^{-1}$ in the voltage window of 4.8-1.5 V; FIGS. 2C and 2D represent the capacity retention of the samples of FIGS. 2A and 2B, respectively, over 20 cycles; FIGS. 2E and 2F represent first-cycle voltage profiles of LMTO and LMTC02O, respectively, at different current densities; FIGS. 2G and 2H represent voltage profiles of LMTO and LMTC02O, respectively, under the galvanostatic intermittent titration technique (GITT) mode; and FIG. 2I represents the apparent Li diffusion coefficients of LMTO and LMTC02O calculated from the GITT results;

FIGS. 3A-3D show the redox mechanism and structural change of $Li_{1.2}Mn_{0.4-x}Ti_{0.4}Cr_xO_2$ in accordance with one or more embodiments of the disclosure, where: FIGS. 3A and 3B represent the Mn K-edge XANES spectra of LMTO and LMTC02O, respectively, in a pristine, 4.8-V-charged, and 1.5-V-discharged states (the spectra of $Mn_2O_3$ and $Li_2MnO_3$ standards are plotted as dashed lines); FIG. 3C represents the Cr K-edge XANES spectra of LMTC02O in a pristine, 4.8-V-charged, and 1.5-V-discharged state (the spectra of $LiCrO_2$, $CrO_2$, and $CrO_3$ standards are plotted as dashed lines); and FIG. 3D represents the fitted Cr K-edge EXAFS spectra of LMTC02O in a pristine and 4.8-V-charged state, where the peaks at ~1.0, ~1.5, and ~2.5 Å correspond to the tetrahedral Cr—O (Cr—$O_{tet}$), octahedral Cr—O (Cr—$O_{oct}$), and Cr-TM coordinations, respectively (the octahedral $CrO_6$ and tetrahedral $CrO_4$ coordinations are shown as insets).

Figure 4A:
Figure 4A:
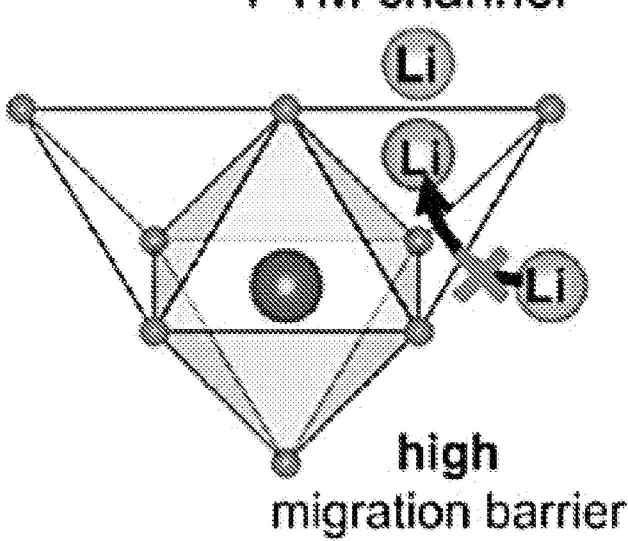
Figure 4A:
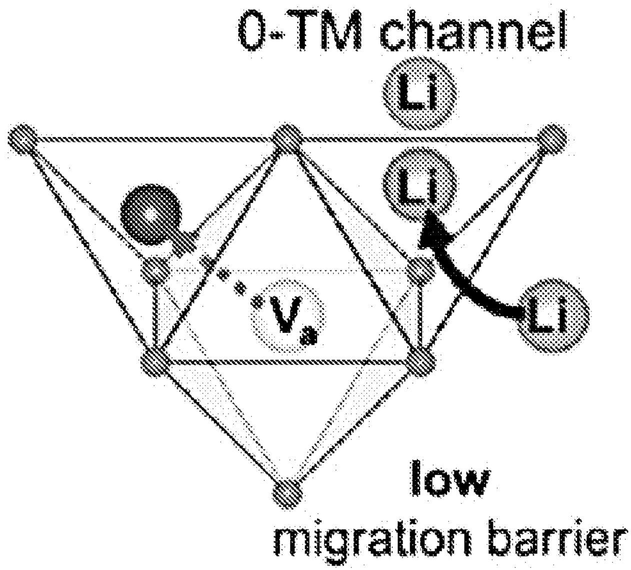
Figure 4B:
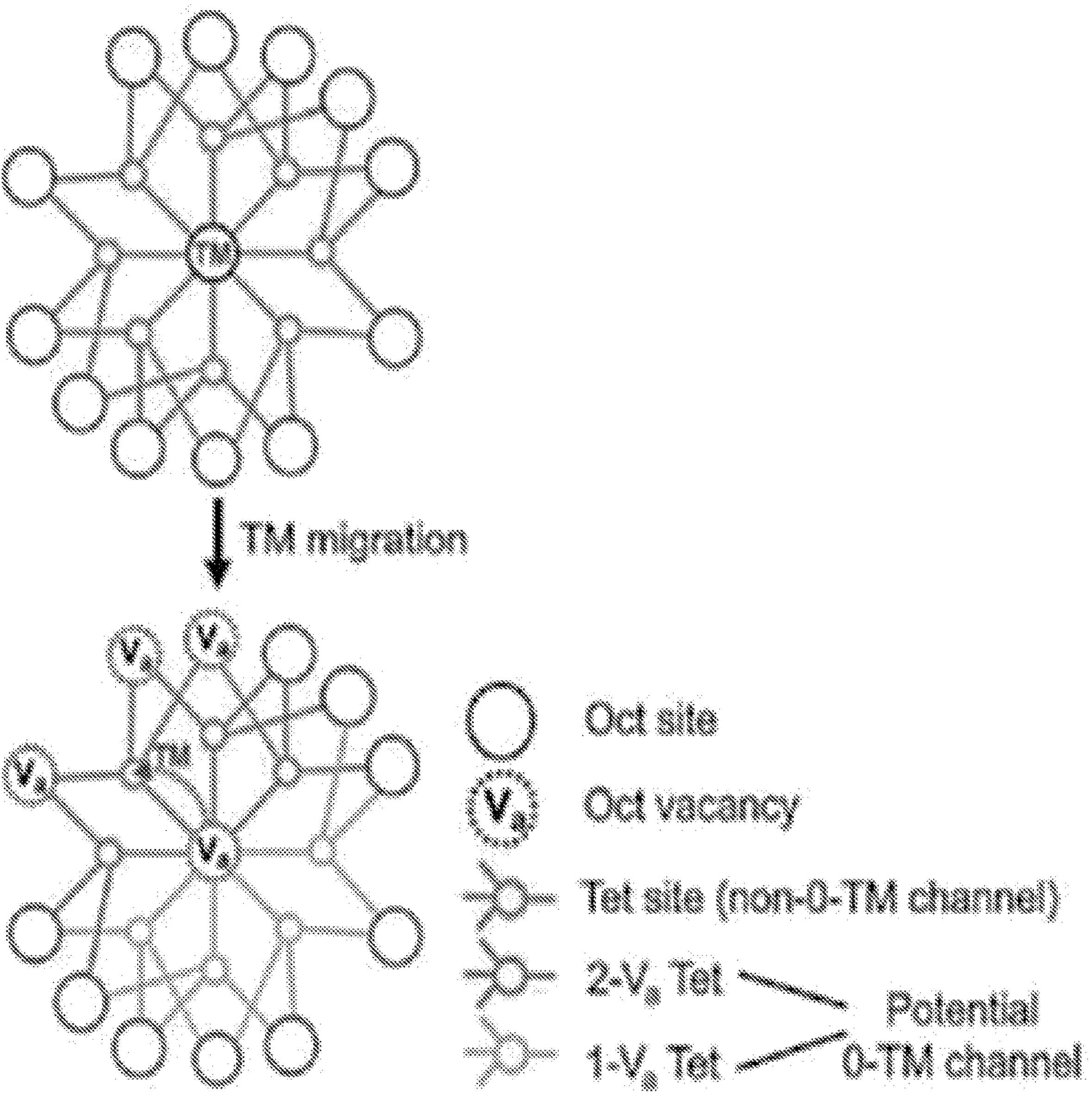
Figure 4C:
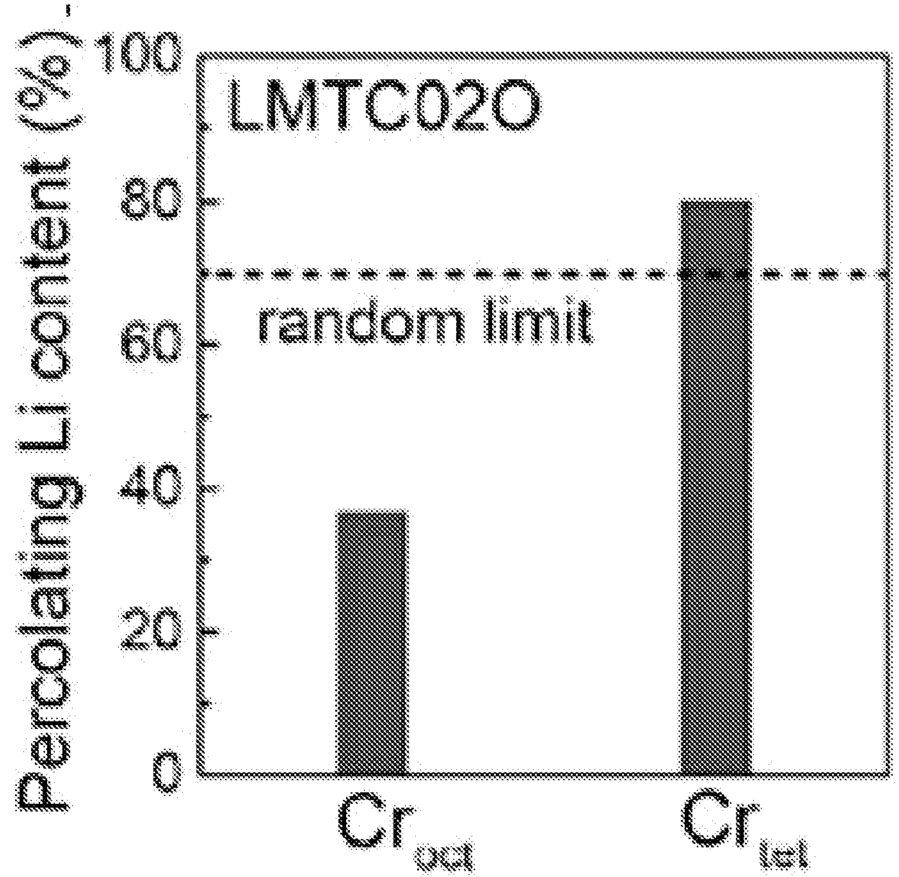
Figure 4D:
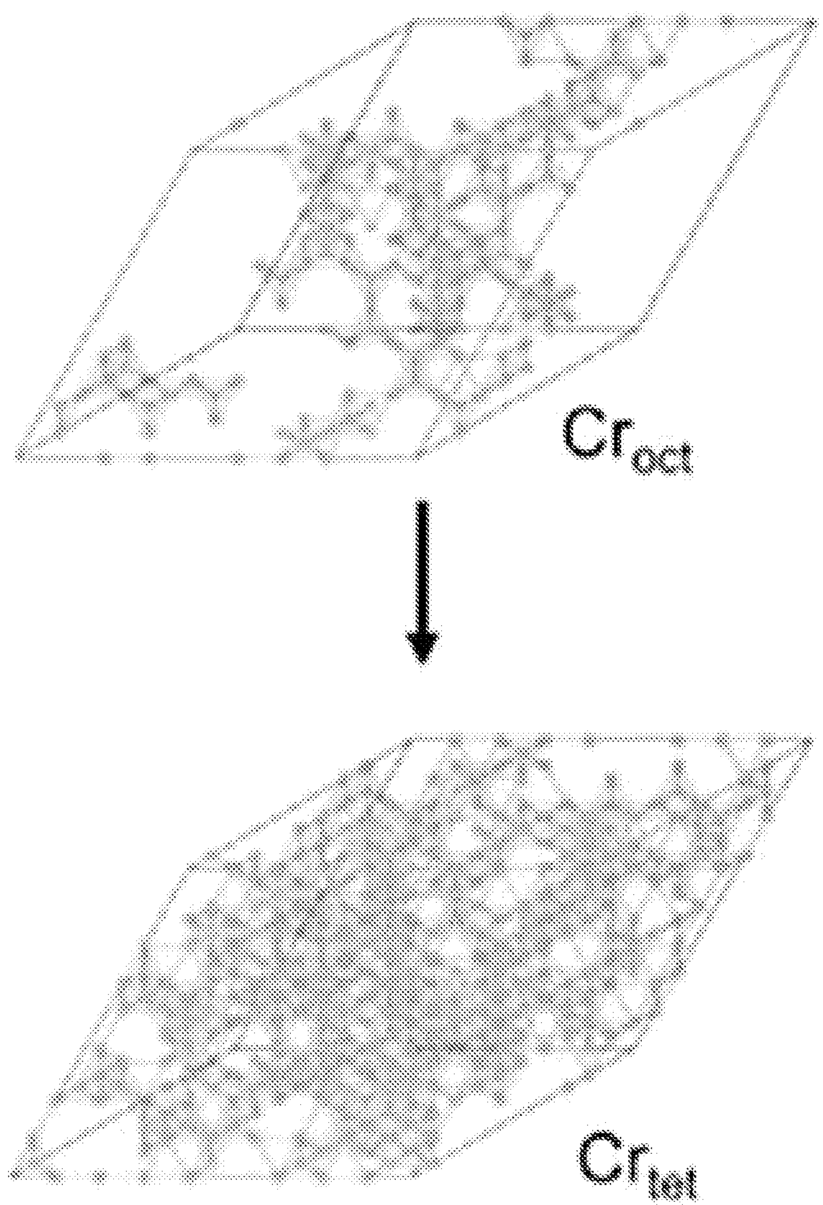
Figures 5A, 5B:
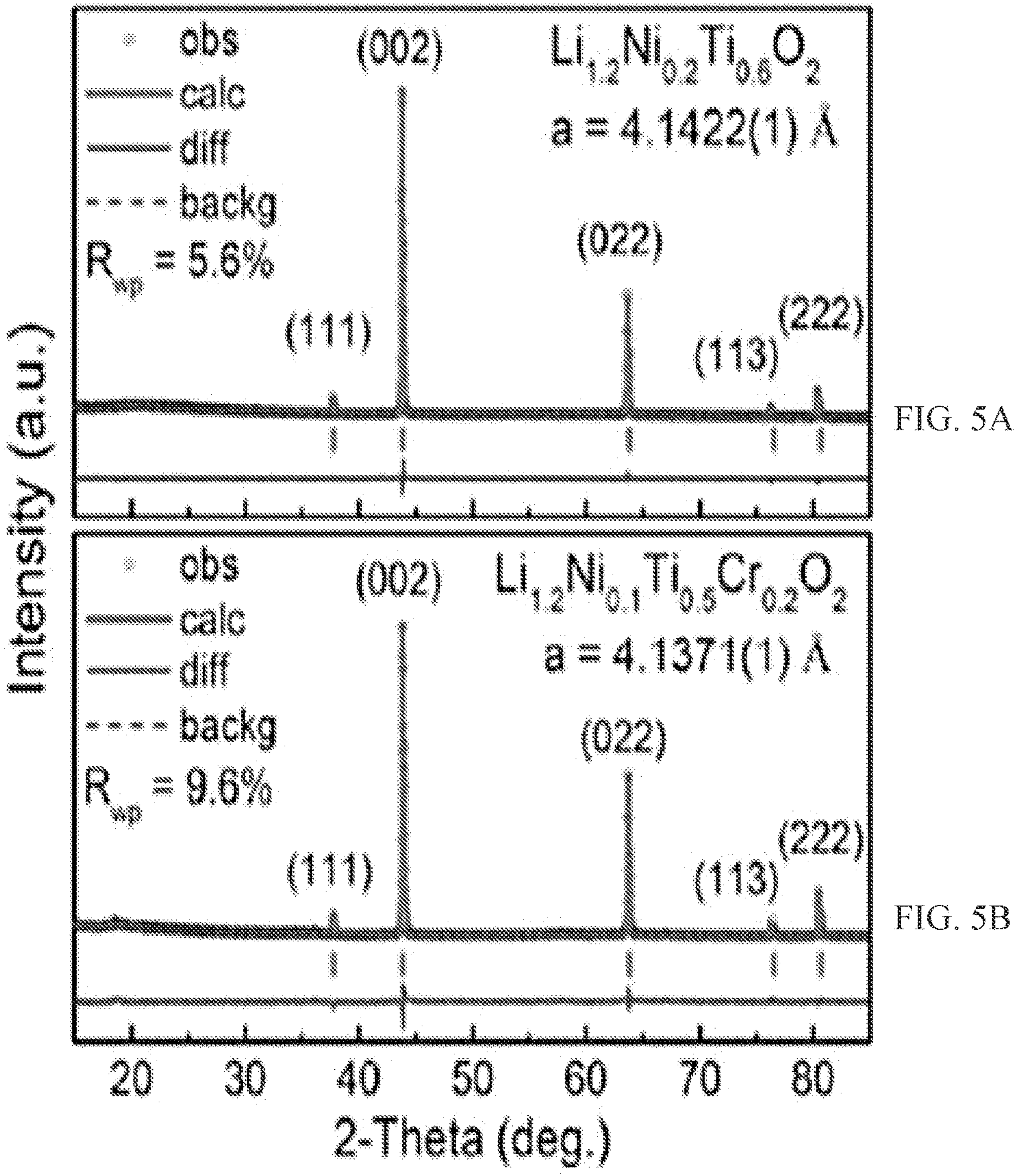
Figures 5C, 5D:
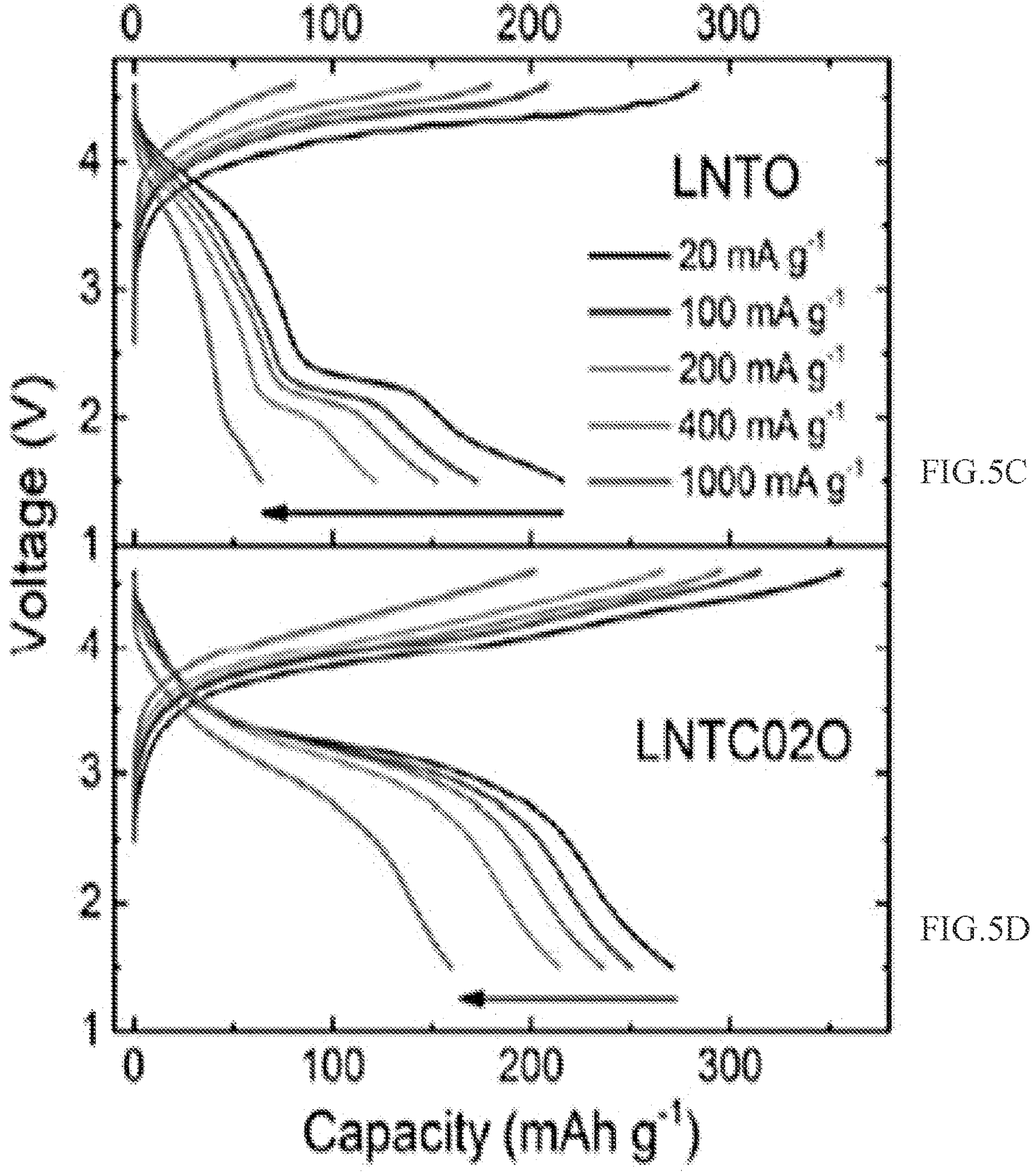
Figures 5E, 5F:
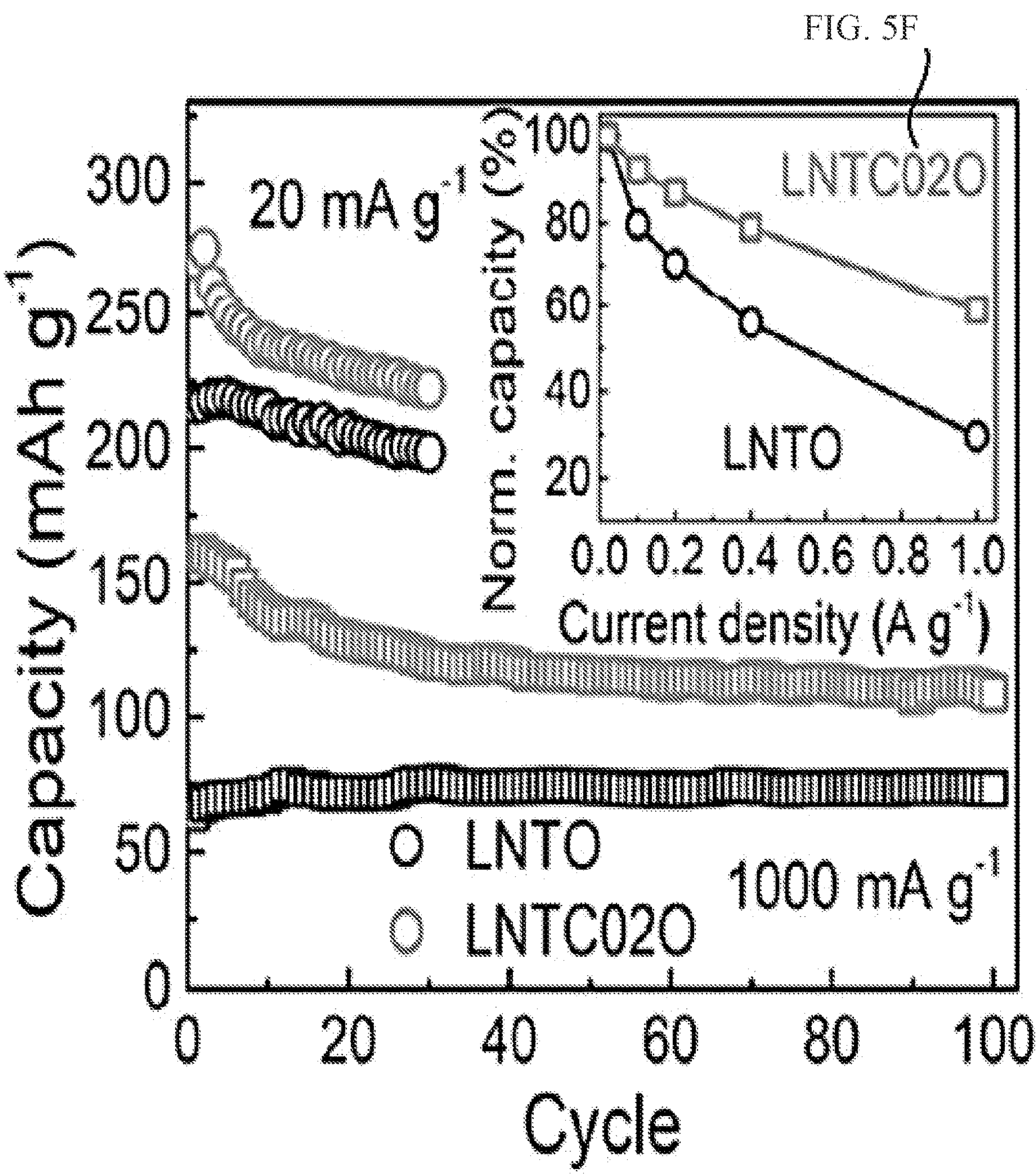
Figure 5G:
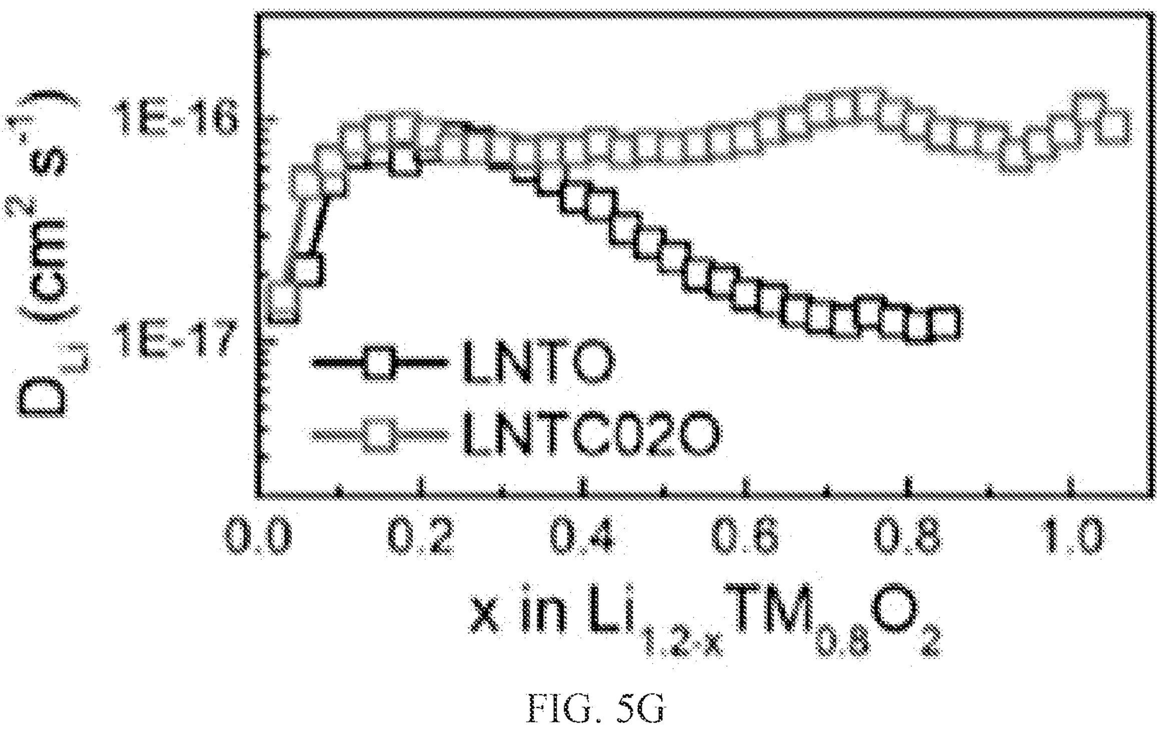
Figure 5H:
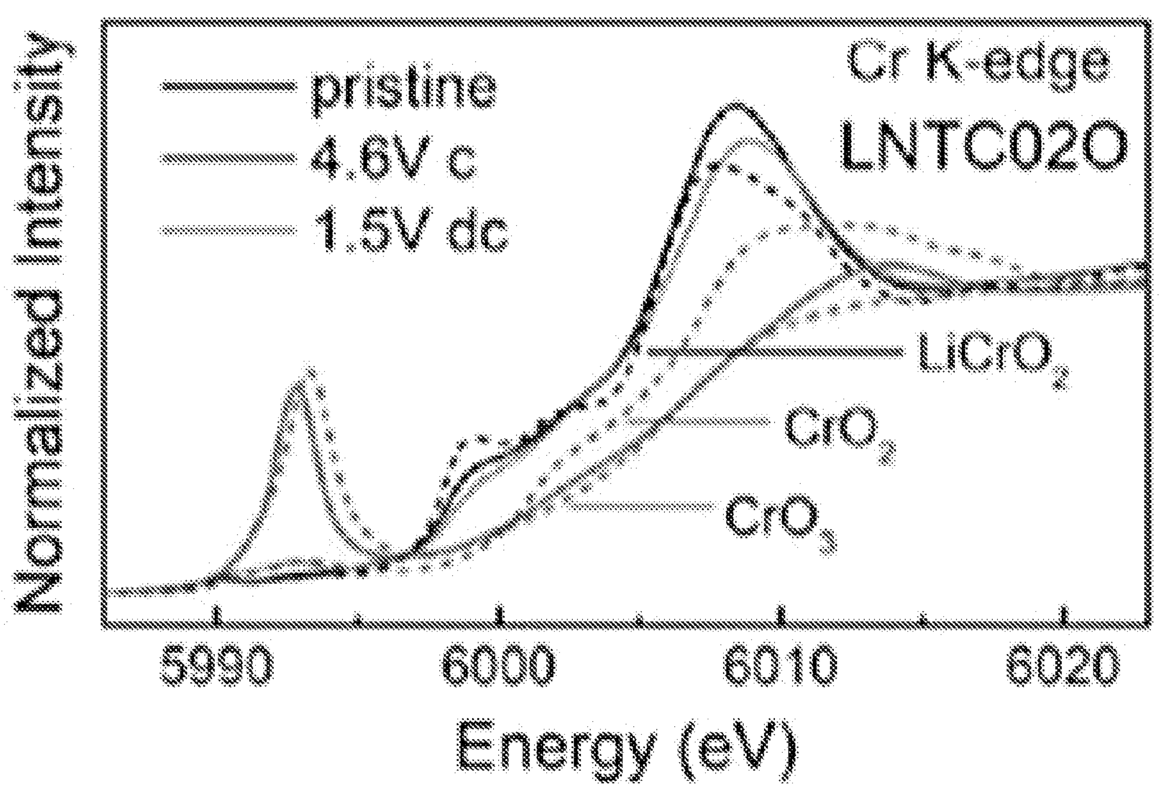
Figure 5I:
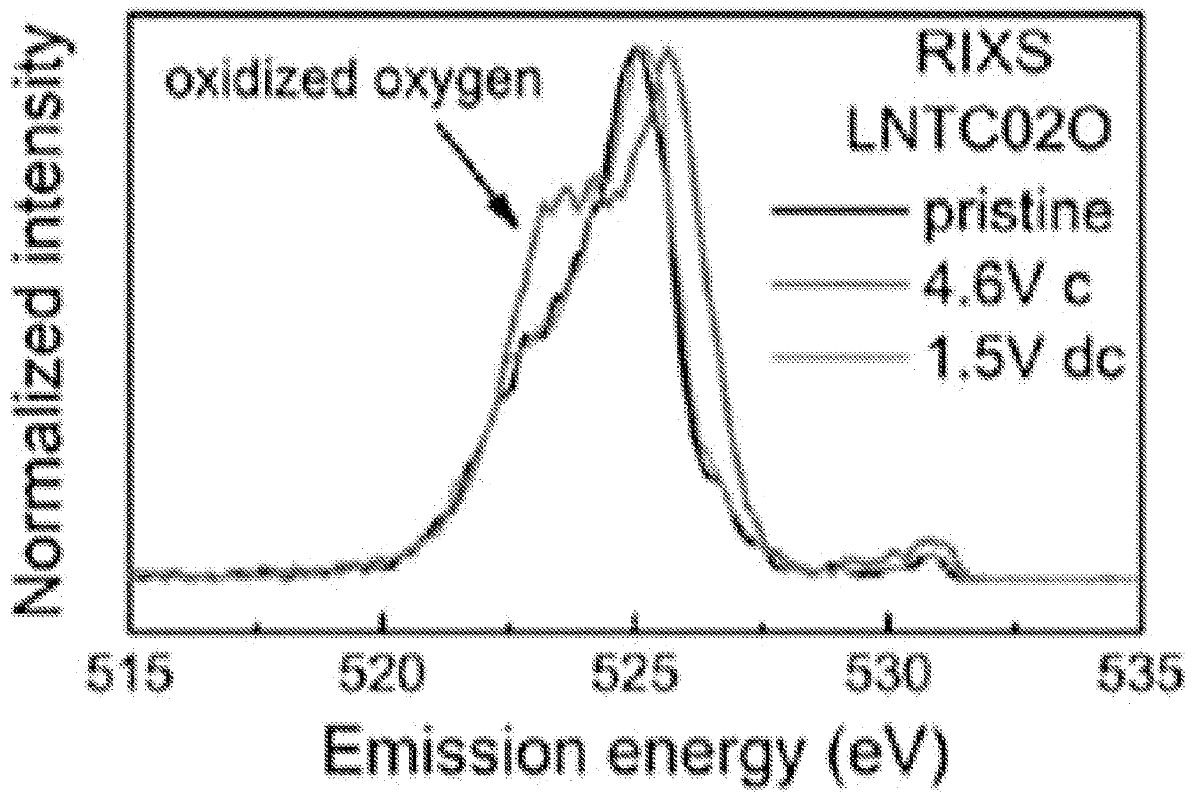

FIGS. 4A-4D show the effect of TM migration on Li kinetics in accordance with one or more embodiments of the disclosure, where: FIG. 4A represents a $TMO_6$ octahedron with two face-sharing tetrahedral sites depicting migration of the TM from the octahedron transforming a 1-TM channel (a tetrahedral site with one face-sharing octahedral TM) into a 0-TM channel; FIG. 4B represents Li pathway availability in a rocksalt-type structure before and after TM migration, where the depicted structure shows an octahedral TM connected to eight tetrahedral sites, the presence of the TM in the octahedral site makes all eight tetrahedral sites non-0-TM channels, and after the TM migrates to a tetrahedral site, the other seven tetrahedral sites become potential 0-TM channels, depending on the cations in the other nearby octahedral; FIG. 4C represents the calculated percolating Li content via 0-TM channel in LMTC02O when Cr occupies octahedral sites ($Cr_{oct}$) in the pristine state and tetrahedral sites ($Cr_{tet}$) after possible migration (the dotted line shows the percolating Li content via the 0-TM channel in the random structure limit); and FIG. 4D represents Monte Carlo simulated structures for LMTC02O with octahedral Cr and tetrahedral Cr (Li are plotted with spheres and 0-TM connected Li are bridged with lines); and FIGS. 5A-5I show the structural characterization and electrochemistry of $Li_{1.2}Ni_{0.2-x}Ti_{0.6-x}Cr_{2x}O_2$, in accordance with one or more embodiments of the disclosure, where: FIGS. 5A and 5B represent XRD patterns and refinement results for $Li_{1.2}Ni_{0.2}Ti_{0.6}O_2$(LNTO) and $Li_{1.2}Ni_{0.1}Ti_{0.5}Cr_{0.2}O_2$ (LNTC02O), respectively; FIGS. 5C and 5D represent first-cycle voltage profiles of LNTO and LNTC02O at different current densities in the voltage window of 4.6-1.5 V; FIG. 5E represents the capacity retention of LNTO and LNTC02O at 20 and 1000 mA $g^{-1}$ in the voltage window of 4.6-1.5 V with FIG. 5F depicting the normalized capacity as a function of current density; FIG. 5G represents the apparent lithium-ion diffusion coefficients of LNTO and LNTC02O calculated from the GITT results; FIG. 5H represents the Cr K-edge XANES spectra of LNTC02O in pristine, 4.6-V-charged; and 1.5-V-discharged state; and FIG. 5I represents the O L-edge RIXS spectra of LNTC02O collected at an excitation energy of 531 eV (the peak at an emission energy of 523.8 eV is a characteristic feature of oxidized oxygen).

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Additionally, where multiples of the same components are described, the multiples may be referred to individually (e.g., ##a, ##b, ##c, etc.) or collectively (##).

In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Described herein are instances where the Li-transport kinetics can be greatly improved when a topotactic reaction is replaced by a non-topotactic reaction. Specifically, Applicant shows that in the DRX $Li_{1.2}Mn_{0.2}Ti_{0.4}Cr_{0.2}O_2$ fast Li transport is enabled by facile and reversible Cr octahedral-to-tetrahedral migration at the top of charge, which creates new paths for Li migration.

Some of the embodiments of the subject matter described herein are compositions of matter. In some embodiments, a lithium metal oxide has a general formula $Li_{1+x}(MM')_{1-x-y}D_yO_2$. M is a redox-active transition metal. M' is a redox-inactive transition metal. D is a metal dopant selected from a group consisting of V, Cr, Fe, and Mo. D is not M or M', and M is not M'. In some embodiments, 0<x≤0.2. In some embodiments, 0.1<x≤0.2. In some embodiments, 0<y≤0.2. In some embodiments, 0.1<y≤0.2. The lithium metal oxide has a cation-disordered rocksalt structure. The metal dopant has an electronic configuration of $d^0$, $d^5$, or $d^{10}$ at the top of charge when the lithium metal oxide is incorporated in a Li-ion battery as a positive electrode material.

In some embodiments, M may comprise one or more of Ni, Mn, Fe, Co, V, Cr, W, and Mo. In some embodiments, M' may comprises one or more of Ti, Zr, Nb, Ta, W, and Mo. In some embodiments, the lithium metal oxide has a general formula $Li_{1.2}(MM')_{0.8-y}D_yO_2$. In some embodiments, D is Cr.

In some embodiments, a lithium metal oxide has a general formula $Li_{1.2}(MM')_{0.8-x}D_xO_2$. M is a redox-active transition metal, such as, for example, Mn or Ni. M' is a redox-inactive transition metal, such as, for example, Ti. D is a metal dopant selected from a group consisting of V, Cr, Fe, Mo, and combinations thereof. D is not M or M' and M is not M'. The lithium metal oxide has a cation-disordered rocksalt structure. In some embodiments, 0<x≤0.2. In some embodiments, 0.1<x≤0.2.

In some embodiments, the lithium metal oxide has a composition $Li_{1.2}Mn_{0.4-x}Ti_{0.4}D_xO_2$. In some embodiments, 0<x≤0.2. In some embodiments, 0.1<x≤0.2. In some embodiments, D is Cr. In some embodiments, the lithium metal oxide has a composition $Li_{1.2}Mn_{0.3}Ti_{0.4}Cr_{0.1}O_2$ (LMTC01O) or $Li_{1.2}Mn_{0.2}Ti_{0.4}Cr_{0.2}O_2$ (LMTC02O).

In some embodiments, the lithium metal oxide has a composition $Li_{1.2}Ni_{0.2-x}Ti_{0.6-x}D_{2x}O_2$. In some embodiments, 0<x≤0.1. In some embodiments, 0.05<x≤0.1. In some embodiments, D is Cr. In some embodiments, the lithium metal oxide has a composition $Li_{1.2}Ni_{0.1}Ti_{0.5}Cr_{0.2}O_2$ (LNTC02O).

Some of the embodiments of the subject matter described herein are methods for manufacturing the compositions of matter. In some embodiments, a method for manufacturing a lithium metal oxide includes providing at least one lithium-based precursor, providing a redox-active transition metal-based precursor, providing a redox-inactive transition metal-based precursor, providing a dopant metal-based precursor wherein the metal is D, and mixing the at least one lithium-based precursor, the redox-active transition metal-based precursor, the redox-inactive transition metal-based precursor, and the dopant metal-based precursor to form a mixture. The lithium metal oxide has a general formula $Li_{1+x}(MM')_{1-x-y}D_yO_2$. M is a redox-active transition metal. M' is a redox-inactive transition metal. D is a metal dopant selected from a group consisting of V, Cr, Fe, and Mo. D is not of M or M', and M is not M'. In some embodiments, 0<x≤0.2. In some embodiments, 0.1<x≤0.2. In some embodiments, 0<y≤ 0.2. In some embodiments, 0.1<y≤0.2. The lithium metal oxide has a cation-disordered rocksalt structure.

In some embodiments, M may comprise one or more of Ni, Mn, Fe, Co, V, Cr, W, and Mo. In some embodiments, M' may comprise one or more of Ti, Zr, Nb, Ta, W, and Mo.

In some embodiments, the redox-active transition metal-based precursor is selected from a group consisting of NiO, $Ni_2O_3$, $MnO_2$, MnO, $Mn_2O_3$, FeO, $Fe_2O_3$, $Co_2O_3$, $V_2O_3$, $VO_2$, $Cr_2O_3$, $W_2O_3$, $MoO_3$, $MoO_2$, and $Mo_2O_3$. In some embodiments, the redox-inactive transition metal-based precursor is selected from a group consisting of $TiO_2$, $ZrO_2$, $Nb_2O_5$, $Ta_2O_5$, $WO_3$, and $MoO_3$, $MoO_2$, and $Mo_2O_3$. In some embodiments, the at least one lithium-based precursor is selected from a group consisting of $Li_2CO_3$, LiOH, $Li_2O_3$, $Li_2SO_4$, LiCl, $LiNO_3$, and combinations thereof. In some embodiments, the dopant metal-based precursor is selected from a group consisting of $V_2O_3$, $VO_2$, $Cr_2O_3$, FeO, $Fe_2O_3$, $MoO_3$, $MoO_2$, and $Mo_2O_3$.

In some embodiments, stoichiometric amounts of the at least one lithium-based precursor, the redox-active transition metal-based precursor, the redox-inactive transition metal-based precursor, and the dopant metal-based precursor are mixed (i.e., stoichiometric amounts precursors to generate a specific composition of a lithium metal oxide). In some embodiments, the at least one lithium-based precursor is added in up to about 15% excess of a specific lithium composition.

In some embodiments, the mixing comprises ball milling; however, other mixing processes are contemplated and considered within the scope of the invention. In some embodiments, after the mixing, the mixture is annealed at about 700° C. to 1200° C. for about 1 hours to 18 hours. In some embodiments, the mixture is annealed under an inert atmosphere. In some embodiments, the mixture is annealed in air.

When the lithium metal oxides described herein are manufactured, the metal dopant is in a low valence state. When one of the lithium metal oxides described herein is used as a positive electrode material in a lithium-ion battery, the valence state of the metal dopant changes (i.e., the metal dopant is oxidized) when the battery is charged. The valence state of the metal dopant changes between a lower valence state and a higher valance state upon discharging and charging, respectively, the battery. Below is a table that sets forth the lower valance and the higher valence states of the metal dopants.

TABLE 1

| metal dopant | lower valence state (discharged battery) | higher valence state (charged battery) |
| --- | --- | --- |
| V | $V^{3+}$ | $V^{5+}$ |
| Cr | $Cr^{3+}$ | $Cr^{6+}$ |
| Fe | $Fe^{2+}$ | $Fe^{3+}$ |
| Mo | $Mo^{3+}$ | $Mo^{6+}$ |

Some of the embodiments of the subject matter described herein are the compositions of matter incorporated in electrodes or batteries. In some embodiments, a positive electrode material includes any of the lithium metal oxides described herein.

In some embodiments, a lithium-ion battery includes a negative electrode material, an electrolyte, and positive electrode material. The positive electrode material includes any of the lithium metal oxides described herein. In some embodiments, the lithium metal oxide exhibits a non-topotactic reaction during charge and discharge of the lithium-ion battery.

Generally, lithium-ion batteries may be constructed in accordance with generally known and accepted methods, including producing individual cells, electrically interconnecting the cells, and incorporating battery control electronics.

There are a variety of methods for manufacturing electrodes for use in a lithium-ion battery, as would be known to a person of ordinary skill in the art. One exemplary process, sometimes referred to as a "wet process," involves adding an active material, a binder and a conducting material (i.e., a cathode mixture) to a liquid to prepare a slurry composition. These slurries are typically in the form of a viscous liquid that is formulated to facilitate a downstream coating operation. A thorough mixing of a slurry can be important for coating and drying operations, which may affect performance and quality of an electrode. Suitable mixing devices include ball mills, magnetic stirrers, sonication, planetary mixers, high speed mixers, homogenizers, universal type mixers, and static mixers. A liquid used to make a slurry can be one that homogeneously disperses an active material, a binder, a conducting material, and any additives, and that is easily evaporated. Suitable slurry liquids include, for example, N Methylpyrrolidone, acetonitrile, methanol, ethanol, propanol, butanol, tetrahydrofuran, water, isopropyl alcohol, di Methylpyrrolidone, and the like.

In some embodiments, a prepared composition is coated on a substrate, such as a current collector, and dried to form an electrode. Specifically, a slurry is used to coat an electrical conductor to form an electrode by evenly spreading a slurry on to the conductor, which is then, in certain embodiments, roll-pressed (e.g. calendared) and heated as is known in the art. Generally, a matrix of an active material and conductive material is held together and on to the conductor by a binder. In certain embodiments, a matrix comprises a lithium conducting polymer binder, such as polyvinylidene fluoride (PVDF), poly(vinylidene fluoride-co-hexafluoropropylene) (PVDF/HFP), polytetrafluoroethylene (PTFE), Kynar Flex® 2801, Kynar® Powerflex LBG, Kynar® HSV 900, Teflon®, styrene butadiene rubber (SBR), polyethylene oxide (PEO), or polytetrafluoroethylene (PTFE). In certain embodiments, additional carbon particles, carbon nanofibers, carbon nanotubes, are dispersed in a matrix to improve electrical conductivity. Alternatively, or additionally, in certain embodiments, lithium ions are dispersed in a matrix to improve lithium conductivity.

In various embodiments, the current collector may be selected from the group consisting of: aluminum foil, copper foil, nickel foil, lithium-metal foil, stainless steel foil, titanium foil, zirconium foil, molybdenum foil, nickel foam, copper foam, carbon paper or the like.

In some embodiments, a lithium-ion battery includes an electrolyte comprising an electrolytic salt, such as, for example, lithium trifluoromethane sulfonimide, lithium triflate, lithium perchlorate, LiPF6, LiBF4, tetraalkylammonium salts (e.g. tetrabutylammonium tetrafluoroborate, TBABF4), liquid state salts at room temperature (e.g. imidazolium salts, such as 1-ethyl-3-methylimidazolium bis (perfluoroethyl sulfonyl)imide, EMIBeti), and the like.

In various embodiments, a lithium-ion battery may include a separator that divides the anode and cathode. In certain embodiments, the separator is an impermeable material substantially, or completely, impermeable to the electrolyte. In some embodiments, a degree of ionic conductivity across a separator is provided, for example via apertures in such separator. In certain embodiments, a separator of impermeable material is configured to allow lithium ion transport between the anode and the cathode of the battery during charging and discharging of a cell. In some such embodiments, a separator does not completely isolate an anode and a cathode from each other. One or more electrolyte-permeable channels bypassing or penetrating through apertures in an impermeable face of a separator may be provided to allow sufficient lithium ion flux between anode and cathode portions of the battery.

Experimental Data Collection:

In some embodiments, the cathode mixture comprises the active material, carbon black (e.g., Timcal SUPER C65 as available from Cambridge Energy Solutions), and polytetrafluoroethylene (PTFE). For the experiments, Applicant mixed the active material, carbon black, and PTFE at a weight ratio of 70:20:10 to prepare the cathode film. First, 210 mg of the active material and 60 mg of carbon black were mixed and shaker-milled for 1 h in an argon atmosphere using a SPEX® 800M mixer, and the PTFE was then added to the mixture and manually mixed for 30 minutes. The three components were rolled into a thin film inside an argon-filled glove box. The electrolyte was 1 M of LiPF6 in 1:1 (volume ratio) with ethylene carbonate (EC) and dimethyl carbonate (DMC). The energy storage devices took the form of coin cells that were assembled using the cathode film, a lithium-metal foil, the electrolyte, and separators (e.g., Whatman® glass microfiber filter as available from Millipore Sigma) in an argon-filled glove box. The loading density of the active material was approximately 3 mg cm-2 for each cathode film.

Galvanostatic intermittent titration technique (GITT): Galvanostatic cycling tests were performed at room temperature using an Arbin battery tester. GITT measurements were performed by charging/discharging the cell for 270 seconds at a current density of 200 mA g-1 and relaxing for 12 h to reach a quasi-equilibrium state. Electro-chemically delithiated/lithiated samples were prepared by charging/discharging the cells at a current density of 20 mA $g^{-1}$, and the charged/discharged cathode films were collected after washing with DMC in an argon-filled glove box.

X-ray diffraction (XRD): XRD patterns of the as-prepared materials were collected using a Bruker D8 ADVANCE diffractometer (Cu source) in the 2 theta range of 15°-85°. Rietveld refinement was performed using the X'Pert High-Score Plus software as available from Malvern Panalytical. Transmission Electron Microscopy (TEM) was performed using a Titan X at 200 kV. EDS mappings were taken in STEM mode. SEM images were obtained using a Zeiss Gemini Ultra-55 analytical field-emission scanning electron microscope with acceleration voltages of 5-10 kV.

Hard X-ray absorption spectroscopy (XAS): Mn K-edge, Cr K-edge, Ti K-edge, and Ni K-edge XAS measurements were performed at beamline 20BM at the Advanced Photon Source, Argonne National Laboratory. The measurements were collected in transmission mode using a Si (111) monochromator. Mn foil (6539 eV), Cr foil (5989 eV), Ti foil (4966 eV), or Ni foil (8333 eV) was simultaneously measured during the experiments to calibrate the energy of the individual data set. All the ex-situ samples were sealed between polyimide tapes to avoid air exposure. The XAS spectra were calibrated and normalized using the Athena software package. The background contribution was limited below $R_{bkg}$=1.0 using the built-in AUTOBK algorithm. The normalized spectra were converted from energy to wave-vector k and then Fourier transformed from k-space to R-space. The R values should be ~0.3 to 0.4 shorter than the actual distances because the Fourier transform was not phase corrected. The EXAFS of the Cr edge was analyzed using the Artemis software package. The EXAFS fitting was conducted using a Hanning window in k, $k^2$, and $k^3$ k-weights simultaneously. The structural models for the fittings were adapted from DPT-calculated structures. The Cr—O and Cr-TM single scattering paths were utilized to fit the octahedral Cr—O and Cr-TM bonds, respectively. To fit the EXAFS spectra with tetrahedral Cr—O contribution, a Cr—O path (1.65 A) generated by FEFF calculation was used. The amplitude reduction factor $S_0^2$ was determined by fitting the Cr foil EXAFS spectrum, and the obtained value (0.7) was used for the fits $k^2$-weighted EXAFS spectra are displayed in the figures.

Soft X-ray resonant inelastic X-ray scattering (RIXS): RIXS data were collected at the iRIXS endstation at beamline 8.0.1 at the Advanced Light Source, Lawrence Berkeley National Laboratory. The samples were mounted on a 1-inch copper sample holder and transferred from an argon glovebox into the ultrahigh-vacuum main chamber using a sealed sample transfer kit. The photon energy was calibrated using the first peak of the standard $TiO_2$ as 531 eV. The O K-edge RIXS maps were generated from the emission spectra at different excitation energies using an Igor code.

Operando differential electrochemical mass spectrometry (DEMS): Custom Swagelok® cells were used for the DEMS measurements. The electrolyte, separators, and anodes used were identical to those used for the coin-cell tests. The loading density of active material was 14 mg $cm^{-2}$ for the cathode film. The hermetically sealed cells were assembled in an argon-atmosphere glovebox and appropriately attached to the DEMS apparatus to avoid air exposure. The cells were cycled at a current of 20 mA $g^{-1}$ using a Bio-Logic VSP-Series potentiostat under positive Ar pressure (approximately 1.2 bar). During electrochemical cycling, the gas evolution was monitored using a custom-built DEMS apparatus.

Computational methods: To evaluate the equilibrium ordering in the multicomponent DRX compounds, a cluster-expansion Hamiltonian was constructed in the configurational space of $LiMnO_2$—$LiCrO_2$-$LhTiO_3$ on a rocksalt lattice. The cluster expansion technique is used to study the configurational thermodynamics of materials in which sites can be occupied by multiple cations, and has been applied to study Li-vacancy configuration in layered materials 40. As in the $LiMnO_2$—$LiCrO_2$-$LhTiO_3$ system, the cation fee lattice can be occupied by Li+-$Ti_4$+-$Mn_3$+-$Cr_3$+. We fit a cluster-expansion model consisting of pair interactions up to 7.1 Å, triplet interactions up to 4 Å, and quadruplet interactions up to 4 Å based on a primitive cell of the rocksalt structure with a=3 Å. The effective cluster interactions (ECIs) were obtained from $l_1$-norm regularized linear regression with the best regularization parameter selected to minimize the cross-validation (CV) score. Finally, the root-mean squared (RMS) cross-validation errors were converged below 8 meV/atom.

Density functional theory (DFT) calculations were performed using the Vienna ab initio simulation package (VASP) using the projector-augmented wave method, a plane-wave basis set with an energy cutoff equal to 520 eV, and a reciprocal space discretization of 25 k-points per Å. All the calculations were converged to 10-6 eV in total energy for electronic loops and 0.02 eV/Å in interatomic forces for ionic loops. We relied on the Perdew-Burke-Emzerhof (PBE) generalized gradient approximation exchange-correlation functional with rotationally averaged Hubbard U correction (GGA+U) to compensate for the self-interaction error on all TM atoms except titanium. The U parameters were obtained from literature, where they were calibrated to TM oxide formation energies (3.9 eV for Mn and 3.5 eV for Cr). The GGA+U computational framework is believed to be reliable in determining the formation enthalpies of similar compounds.

Monte Carlo simulations on these cluster expansion Hamiltonians were performed in a canonical ensemble using Metropolis-Hastings sampling on a 8×9×10 supercell (1440 atoms) of the primitive unit cell of the rocksalt structure. Percolation analysis was completed on these sampled structures using the dribble package.

To compare the formation energies of $Cr_{oct}$ and $Cr_{tet}$, a special quasi random structure (SQS) was generated with composition $Li_{1.2}Mn_{0.2}Cr_{0.2}Ti_{0.4}\ O_{2.0}$ to represent the random arrangement of 120 atoms. All the $Li_3Cr$ clusters in the SQS structure were considered for Cr migration because the large electrostatic repulsion between face-sharing tet-Cr and oct-TM prohibits the occupancy of Cr in the tetrahedral site. Starting from the $Li_3Cr$ tetrahedral cluster, a tri-vacancy configuration was created by removing the three Li atoms in the $Li_3Cr$ cluster. The energy of the system with the Cr atom placed in either the octahedral or tetrahedral site was evaluated. The SCAN meta-GGA exchange-correlation functional was used with a reciprocal space discretization of 25 k-points per Å. The SCAN function is believed to better capture charge transfer due to redox, which would improve the accuracy of energetics involving Li removal. All the calculations were converged to 10-6 eV in total energy for electronic loops and 0.02 eV/Å in interatomic forces for ionic loops.

The following examples are intended to be examples of the embodiments disclosed herein, and are not intended to be limiting.

Example 1

Characterization and Electrochemistry of $Li_{1.2}Mn_{0.4-x}Ti_{0.4}Cr_xO_2$.

Li-rich cation-disordered rocksalt (DRX) materials possess a face-centered-cubic (fcc) anion framework with Li transport occurring through a percolation network of Li-rich tetrahedral environments (0-TM channels, where the tetrahedral site does not face-share with any TM). As Li percolation is supported by the connectivity of available tetrahedral 0-TM channels, any TM occupancy in the tetrahedral site can potentially disrupt such connectivity, and TM migration in DRX materials can be detrimental to Li transport.

Surprisingly, Applicant observed that cation-disordered $Li_{1.2}Mn_{0.2}Ti_{0.4}Cr_{0.2}O_2$, where most of the Cr has migrated to tetrahedral sites at the top of charge (TOC), shows significantly improved rate performance (40% vs. 57% capacity reduction when increasing rate from 20 to 1000 mA $g^{-1}$) relative to $Li_{1.2}Mn_{0.4}Ti_{0.4}O_2$, which has no tetrahedral TM upon charging. Applicant demonstrated that the subtle change in the Cr coordination environment redefines the 0-TM Li percolation network at the TOC and increases the percolating Li content, contributing to the high-rate performance. To prove the generalizability of this TM migration concept, Applicant also applied the Cr substitution to a Ni-based DRX system and similarly achieved a significant increase in rate performance (160 mAh $g^{-1}$ delivered in 10 min). In contrast to the conventional view of TM migration, the results suggest that the appropriate use of facile TM migration is promising for the design of high-performance cathode materials.

Cation-disordered $Li_{1.2}Mn_{0.4}Ti_{0.4}O_2$ (LMTO), $Li_{1.2}Mn_{0.3}Ti_{0.4}Cr_{0.1}O_2$ (LMTC01O), and $Li_{1.2}Mn_{0.2}Ti_{0.4}Cr_{0.2}O_2$ (LMTC02O) were synthesized using a solid-state method. $Li_2CO_3$, $Mn_2O_3$, $TiO_2$, and $Cr_2O_3$ were used as precursors, with the use of 5% excess $Li_2CO_3$. The precursors were mixed in ethanol and ball milled for 15 h. The mixture was then dried and pelletized. To prepare $Li_{1.2}Mn_{0.4}Ti_{0.4}O_2$, $Li_{1.2}Mn_{0.3}Ti_{0.4}Cr_{0.1}O_2$, and $Li_{1.2}Mn_{0.2}Ti_{0.4}Cr_{0.2}O_2$, the precursor mixtures were heated at 1000° C., 1000° C., and 1050° C. for 10 h under argon, respectively.

The X-ray diffraction (XRD) patterns of the three samples were indexed to a disordered rocksalt phase (Fm-3m) without any apparent impurity peaks as shown in FIGS. 1A-1C. The Rietveld refinement results indicated that the lattice constant decreases from 4.1530 to 4.1480 and 4.1420 with increasing Cr substitution, consistent with the smaller ionic radius of $Cr^{3+}$ than $Mn^{3+}$. The energy-dispersive X-ray spectroscopy (EDS) mappings showed that elements were uniformly distributed in LMTO and LMTC02O. The as-prepared materials were shaker-milled for the electrochemical measurements. Scanning electron microscopy (SEM) images revealed similar particle sizes of approximately 200 nm in the three samples.

Galvanostatic cycling at 20 mA $g^{-1}$ between 1.5 and 4.8 V indicated that the $Li_{1.2}Mn_{0.4-x}Ti_{0.4}Cr_xO_2$ samples had similar initial charge and discharge capacities as shown in FIGS. 2A and 2B. The LMTO and LMTC02O delivered discharge capacities (energy densities) of 253 (786 Wh $kg^{-1}$) and 257 mAh $g^{-1}$ (790 Wh $kg^{-1}$), respectively. Upon increasing the current density from 20 to 1000 mA $g^{-1}$, the initial discharge capacity of LMTO decreased to 109 mAh $g^{-1}$ at 1000 mA $g^{-1}$. In contrast, the initial discharge capacity of LMTC02O remained at 155 mAh $g^{-1}$ at 1000 mA $g^{-1}$. The higher rate capability of LMTC02O was also observed for subsequent cycles. See also FIGS. 2C-2F.

Galvanostatic intermittent titration technique (GITT) measurements were used to probe the Li kinetics in $Li_{1.2}Mn_{0.4-x}Ti_{0.4}Cr_xO_2$. The quasi-equilibrium voltage profiles of LMTO and LMTC02O did not display large hysteresis (see FIGS. 2G and 2H). The apparent Li diffusion coefficient was determined by determining the chemical diffusion coefficient from the GITT and dividing it by the thermodynamic enhancement factor. As the Li content was reduced from $Li_{1.2}TM_{0.8}O_2$ to $Li_{0.6}TM_{0.8}O_2$, LMTO and LMTC02O maintained similar Li diffusion coefficients of 2-4×$10^{-16}$ $cm^2$ $s^{-1}$ (see FIG. 2I). However, the apparent Li diffusion coefficient of LMTO decreased by one order of magnitude when more than 0.6 Li per $Li_{1.2}TM_{0.8}O_2$ formula unit (f.u.) is extracted while such a decrease is not observed in LMTC02O upon charging. Approximately 1 Li per f.u. can be extracted with a reasonable Li diffusion coefficient (>2×$10^{-16}$ $cm^2$ $s^{-1}$) from LMTC02O indicating improved Li kinetics of LMTC02O relative to that of LMTO at the TOC. The improved Li kinetics of LMTC02O upon charging contribute to its improved rate performance relative to LMTO. Note that the actual diffusion coefficient depends on an approximation for the active surface area, however this uncertainty does not affect the relative variations with Li content.

Example 2

Redox Mechanism and Structural Change

Hard X-ray absorption spectroscopy (XAS) and soft X-ray resonant inelastic X-ray scattering (RIXS) were used to analyze the TM and oxygen redox in LMTO and LMTC02O, respectively, as shown in FIGS. 3A-3C. Mn K-edge X-ray absorption near edge structure (XANES) spectra revealed that both LMTO and LMTC02O undergo $Mn^{3+}/Mn^{4+}$ oxidation when charged to 4.8 V (see FIGS. 3A and 3B). Upon discharging to 1.5 V, the XANES spectra of LMTO and LMTC02O almost recover to those of the pristine states, indicative of the reduction of $Mn^{4+}$ to $Mn^{3+}$. Comparison of the pre-edge regions of the $CrO_3$ standard and the 4.8-V-charged LMTC02O in the Cr K-edge XANES spectra provides strong evidence that $Cr^{3+}$ in LMTC02O is fully oxidized to $Cr^{6+}$ (see FIG. 3C). The prominent pre-edge feature disappeared as LMTC02O is discharged to 1.5 V, indicating that the $Cr^{3+}/Cr^{6+}$ redox is mostly reversible. Ti K-edge XANES indicates that $Ti^{4+}$ in LMTO and LMTC02O is not redox-active within the applied voltage window.

The oxidation of lattice oxygen was probed using O K-edge RIXS, which has been shown to be reliable in detecting the chemical state of oxygen. Excitation to unoccupied/oxidized O 2p orbitals results in the appearance of a feature at an excitation energy of ~531 eV and an emission energy of 523.8 eV, which can be used as characteristic of an oxidized oxygen state. The RIXS maps of the O K-edge showed the characteristic signals in the 4.8-V-charged LMTO and 4.8-V-charged LMTC02O, indicating the oxidation of lattice oxygen upon charging. Operando differential electrochemical mass spectrometry (DEMS) analysis revealed minor $O_2$ gas evolution upon charging in both LMTO and LMTC02O, suggesting a small amount of irreversible oxygen oxidation. This O-release is common in DRX cathodes, but is generally smaller than in high Ni layered cathodes. The observed $CO_2$ evolution may originate from the oxidation of residual lithium carbonate or the carbonate solvents, as shown in the literature.

The ex-situ XRD patterns indicated that the bulk structural change in LMTO and LMTC02O is reversible upon charging and discharging. The lattice constants only decreased by 1.4% (LMTO) and 1.0% (LMTC02O) after charging to 4.8 V and almost recover to those of the pristine state after discharging to 1.5 V, reiterating the very small volume changes seen in some DRX materials. The local structural changes were characterized using extended X-ray absorption fine structure (EXAFS) spectroscopy. The fitted Cr K-edge EXAFS spectra revealed that all the Cr resided in octahedral sites ($Cr_{oct}$) in the pristine state of LMTC02O and that all the Cr migrated to tetrahedral sites ($Cr_{tet}$) in the 4.8-V-charged state (FIG. 3D). Most of the tetrahedral Cr reversibly migrated back to the octahedral sites upon discharging to 1.5 V. The occupation of Mn and Ti in the tetrahedral sites was not observed in LMTO or LMTC02O, confirming that $Mn^{3+}$ ($Mn^{4+}$) and $Ti^{4+}$ prefer the octahedral sites.

Discussion—Li Diffusion

Li diffusion in rocksalt-like oxides occurs by oct-tet-oct jumps. While in layered cathode materials these Li jumps are confined to the two-dimensional Li slab, in DRX materials they occur through the statistically percolating network of tetrahedral sites that have no face-sharing TM (0-TM). Thus, an increase in the amount and connectivity of 0-TM tetrahedra is conducive to improving the Li kinetics in DRX materials. FIG. 4A illustrates how occupation of an octahedral site by a TM inhibits Li migration through the eight tetrahedral sites it shares a face with. If this octahedral TM moves into a neighboring tetrahedral site (see FIG. 4B) it creates seven potential new 0-TM channels, depending on the occupancy of the other octahedra these tetrahedra face-share with.

Specific conditions are required for a TM to migrate to a tetrahedral site: (1) A tetrahedral site can only be occupied when its face-sharing octahedral sites are empty, which is more likely near the TOC where Li tri-vacancies can form; (2) The TM has to prefer 4-fold over 6-fold coordination, which is determined by its electronic structure and size. As shown by the XAS results, $Cr^{6+}$ forms in the charged state, which, with its $d^0$ electronic configuration and small ionic radius in the tetrahedral site (0.26 Å according to the literature) is likely to favor the tetrahedral site. The tri-vacancy condition for the migration event allow us to partially characterize the environment of the tetrahedral sites around the octahedral site that is vacated by TM migration as shown in FIG. 4B. Three of the tetrahedra face-share with at least two octahedral vacancies (2-$V_a$ tetrahedra, circles in FIG. 4B), and four tetrahedra have one octahedral vacancy guaranteed (1-$V_a$ tetrahedra, circles in FIG. 4B). The 2-$V_a$ and 1-$V_a$ tetrahedra become 0-TM channels if the other face-sharing octahedral sites are occupied by a Li (or vacancy at later stages of delithiation). As sixty percent of the octahedral sites are occupied by Li in $Li_{1.2}TM_{0.8}O_2$, the 2-$V_a$ tetrahedra have a 36% (0.6×0.6) possibility of being a 0-TM channel, and the 1-$V_a$ tetrahedra have a 21.6% (0.6×0.6×0.6) possibility of being a 0-TM channel, assuming a random cation distribution. Therefore, Cr migration will generate on average ~2 (0.36×3+0.216×4) new 0-TM channels out of the eight tetrahedral sites. This demonstration shows that TM octahedral-to-tetrahedral (oct-tet) migration in a disordered rocksalt-type structure is likely to create additional Li transport pathways, leading to better Li kinetics.

In an actual DRX material, cation short-range order (SRO) affects the overall cation distribution, which determines the amount and connectivity of the 0-TM channels. To model such a more realistic condition, Applicant performed cluster-expansion Monte Carlo (MC) simulations to investigate the changes in Li percolation by Cr oct-tet migration in the presence of SRO, as shown in FIGS. 4C and 4D. MC simulation was performed at 1273 K, with 1000 MC representative structures sampled from the equilibrium ensemble. In the pristine (discharged) state ~36% Li were found to be part of the 0-TM percolating network in LMTC02O, about the same as for LMTO. To reveal how Cr migration modifies the percolating Li content, Applicant first investigated whether Cr migration is energetically favorable upon delithiation. Applicant compared the energies of $Cr_{oct}$ and $Cr_{tet}$ in the presence of a tri-Li vacancy, and found that migration of Cr to the tetrahedral sites lowers the energy by ~1.4 eV, indicating feasible Cr migration to the tetrahedral site. Applicant found that in the MC configurations sampled at 1273 K, 87% of the Cr was in an environment where it would be able to migrate to a near-neighbor tetrahedral site upon delithiation in LMTC02O. As a result of this migration ~80% of the Li sites become part of the 0-TM network, which more than doubles the amount of Li that is part of the percolating migration path. Overall, it is remarkable how this subtle change in the Cr coordination environment redefines the Li percolation network, leading to improved Li kinetics.

Example 3

Characterization and Electrochemistry of $Li_{1.2}Ni_{0.2-x}Ti_{0.6-x}Cr_{2x}O_2$ To verify the generalizability of this concept to other DRX materials, Applicant also studied a Ni-based system by comparing the rate behavior of cation-disordered $Li_{1.2}Ni_{0.2}Ti_{0.6}O_2$ (LNTO) with that of $Li_{1.2}Ni_{0.1}Ti_{0.5}Cr_{0.2}O_2$ (LNTC02O).

$Li_{1.2}Ni_{0.2-x}Ti_{0.6-x}Cr_{2x}O_2$ was synthesized using a solid-state method. $Li_2CO_3$, $NiCO_3$, $TiO_2$, and $Cr_2O_3$ were used as precursors, with the use of 5% excess $Li_2CO_3$. The precursors were mixed in ethanol and ball milled for 15 h. The mixture was then dried and pelletized. To prepare $Li_{1.2}Ni_{0.2}Ti_{0.6}O_2$ and $Li_{1.2}Ni_{0.15}Ti_{0.55}Cr_{0.1}O_2$, the precursor mixtures were heated at 1000° C. for 3 h in air. To prepare $Li_{1.2}Ni_{0.1}Ti_{0.5}Cr_{0.2}O_2$, the mixture was heated at 1050° C. for 10 h in air.

The XRD patterns (see FIGS. 5A and 5B) and TEM results indicated that Cr could be successfully introduced into the bulk structure of LNTC02O. The rate performance of the Cr substituted sample was considerably higher than that of the non-substituted sample, even though the amount of Ni redox is decreased. Whereas $Li_{1.2}Ni_{0.2}Ti_{0.6}O_2$(LNTO) only retained 30% of its capacity (216 to 64 mAh $g^{-1}$) upon increasing the current density from 20 to 1000 mA $g^{-1}$, LNTC02O retained 60% (271 to 160 mAh $g^{-1}$) for the same current increase (see FIGS. 5C and 5D). Upon electrochemical cycling at 1000 mA $g^{-1}$, LNTC02O maintained a reversible capacity of 110 mAh $g^{-1}$ for 100 cycles, see FIG. 5E. In the voltage window of 4.3-1.5 V, the $Li_{1.2}Ni_{0.2-x}Ti_{0.6-x}Cr_{2x}O_2$ samples all showed reasonable capacity retention with <0.3% capacity fade per cycle, and LNTC02O maintained a capacity >184 mAh $g^{-1}$ for 50 cycles at 20 mA $g^{-1}$. The apparent Li diffusion coefficients, determined from GITT, indicate similar Li kinetics in LNTO and LNTC02O during the initial delithiation process (x in $Li_{1.2-x}TM_{0.8}O_2$ is <0.3), see FIG. 5G. When more Li was removed, the diffusion coefficient in LNTO continuously decreased to $\sim 1\times 10^{-17}$ $cm^2$ $s^{-1}$ whereas diffusivity of lithium in LNTC02O remained at $\sim 1\times 10^{-16}$ $cm^2$ $s^{-1}$ for the full range of 1 $Li^+$ per f.u. extraction. The faster Li kinetics of LNTC02O in the highly delithiated state can be attributed to the formation of tetrahedral $Cr^{6+}$ during the charge process (see FIG. 5H), consistent with that of the Cr-substituted Mn-based samples. RIXS spectra also revealed oxygen oxidation in both the LNTO and LNTC02O samples, as evidenced by the peak at the emission energy of 523.8 eV (see FIG. 5I). The peak feature of oxidized oxygen disappeared when LNTO/LNTC02O was discharged to 1.5 V, indicating the reduction of oxidized oxygen.

Discussion—Non-Topotactic Behavior in Other DRX Materials

Applicant posits that this non-topotactic behavior is also responsible for the reported performance of some other DRX materials. A relatively low percolating Li content (<15%) has been predicted in some V-based DRX materials ($Li_{1.2}V_{0.6}Nb_{0.2}O_2$ and $Li_{1.2}V_{0.67}Mo_{0.13}O_2$), somewhat inconsistent with the good performance of these materials as disordered $Li_{1.25}V_{0.5}Nb_{0.25}O_2$ delivers initial charge/discharge capacities of 250 mAh $g^{-1}$, corresponding to 67% Li utilization. The prominent pre-edge feature in the V K-edge XANES spectra implies the presence of tetrahedral $V^{5+}$ in the charged state, although detailed V—O bond analyses (for example, V K-edge EXAFS) would be required to unambiguously confirm this. But it appears likely that, as in the Cr-doped systems, $V^{5+}$ migration to tetrahedral sites improves the Li diffusion network and hence the kinetics of this material as it is being charged.

Our experimental and theoretical results indicate that non-topotactic delithiation can improve the Li kinetics. The rate performance of both for Mn and Ni redox based DRX materials is significantly improved by the addition of Cr. Further support for the benefits of Cr migration on the Li kinetics is the lack of any drop in the measured Li diffusivity in the Cr-doped samples, whereas undoped samples see reduced diffusivity after about 100 mAh $g^{-1}$ (LNTO) and 200 mAh $g^{-1}$ (LMTO). These results are consistent with the ab-initio computed driving force for Cr to migrate to tetrahedral sites near the TOC, and the geometric analysis showing that TM migration produces an increase in lithium pathways. The rate performance of the Cr-doped materials is superior to that of state-of-the-art Li-rich cathodes, such as doped $Li_{1.2}Ni_{0.2}Mn_{0.6}O_2$, Li-rich NMC, and $Li_2RuO_3$-based materials despite the presence of oxygen oxidation (RIXS results). Some recent studies on Li-rich layered cathodes have shown that the oxidized oxygen species are stabilized by metal-oxygen decoordination, which requires TM migration. It is possible that the Cr oct-tet migration in DRX materials creates such metal-oxygen decoordination, thereby limiting its ability to degrade the rate.

The obtained results may force a rethinking of the conventional view that TM migration is an unfavorable phenomenon that impedes Li transport and increases hysteresis. Applicant now discusses in more detail the specific requirements for non-topotactic changes to improve kinetics, first with a specific focus on the Cr-doped DRX systems, and then in a broader, more general context of cathode materials.

The transition metal is the main obstacle for the diffusion of Li as its electrostatic repulsion dominates the energy in the activated state. From this perspective, displacement of some transition metals to tetrahedral sites is favorable as it clears multiple oct-tet-oct paths from neighboring transition metals, lowering the barrier for lithium to migrate through them, as the analysis in FIG. 4B shows. Migration of a TM from an octahedral to a tetrahedral site is enabled by an appropriate electronic configuration and ionic size. While $d^3$-$Cr^{3+}$ has a strong preference for octahedral occupancy, the oxidized $d^0$-$Cr^{6+}$ has no ligand field stabilization in the octahedral site. Other electronic configurations, such as $d^5$ and $d^{10}$ are also favorable for TM migration to the tetrahedral site. Another contributing factor for facile TM migration is the match between the TM size and the tetrahedron height. For example, a tetrahedron height of 2.39 Å (centroid-vertex distance of 1.79 Å) is large enough for a tetrahedral Cr—O bond (1.64 Å) but too small for a tetrahedral Ti—O bond (1.80 Å). As a result, $d^0$-$Cr^{6+}$ migrates to the tetrahedral site while $d^0$-$Ti^{4+}$ remains octahedral. In some layered cathodes with larger tetrahedron height (~2.56 Å), oct-tet migration of $Ti^{4+}$ does occur showing that both the requirements for the electronic configuration and ionic size need to be satisfied to enable TM migration.

While the focus has been on non-topotactic Li-cycling in DRX materials, Applicant highlights a set of more general conditions that may have to be satisfied in order for non-topotactic behavior not to impede transport. First, the non-topotactic processes should be fast and reversible. Slow processes will cause hysteresis, which reduces the discharge energy. As only a few atomic hops may be required for the non-topotactic process, atomic migration processes with an activation barrier below 1 eV are relevant. In the example of Cr-substituted DRX materials, a single hop from an octahedral site to a tetrahedral site is all that is needed to improve Li kinetics. Second, if possible, the non-topotactic processes should be non-cooperative. Large-scale coordinated processes tend to have a high activation energy and almost certainly will lead to hysteresis. This requirement exemplifies one advantage of DRX materials. Because of their disordered nature, the oct-tet TM migration at a specific site occurs independently of the migration at other sites, creating essentially a set of randomly oriented strain dipoles. This is in contrast with layered materials that have oct-tet migration, such as $LiCrO_2$, where preferential migration of Cr into the tetrahedral site in the Li layer creates a much more cooperative transition.

It may be possible to also improve layered oxides by enabling non-topotactic phenomena. Near the TOC layered materials experience a large contraction of slab spacing which reduces the Li mobility. The presence of other cations in the slab can mitigate this contraction by acting as a "pillar" and increase Li mobility at TOC. However, in the discharged state, small high-valent ions usually contract the slab space too much, reducing the discharge kinetics. The difference in performance this leads to can, for example, be seen by comparing solid-state synthesized $Li(Ni_{0.5}Mn_{0.5})O_2$ which has considerable Ni in the Li slab, with ion-exchanged $Li(Ni_{0.5}Mn_{0.5})O_2$, which has almost no Ni in the Li layer. An ion that would move to the Li-slab at TOC and move back into the TM layer at the end of discharge would improve kinetics at both charge and discharge. Other non-topotactic, but reversible metal migrations, have been observed in Mg intercalation electrochemistry.

Described herein is significantly improved rate performance in cation-disordered rocksalt cathodes due to a non-topotactic reaction, which is in contrast to the conventional view that fast Li transport is favored by perfectly topotactic systems. In the examples, the fast non-topotactic reaction is enabled by reversible TM migration between the oct and tet site which improves the Li diffusion network by creating additional Li-transport pathways. Applicant believe that well engineered non-topotacticity is a new opportunity to design high capacity cathode materials.

In the foregoing specification, the disclosure has been described with reference to specific embodiments. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of invention.

What is claimed is:

1. A lithium metal oxide comprising a cation-disordered rocksalt structure comprising a general formula of $Li_{1.2}M_{0.8-x-y}M'_yD_xO_2$, wherein:

M is a redox-active transition metal selected from the group consisting of Mn and Ni;

M' is a redox-inactive transition metal Ti;

D is a metal dopant selected from a group consisting of V, Cr, Fe, and Mo;

$0<x\leq 0.2$; and $y\geq 0.4$.

2. The lithium metal oxide of claim 1 having a composition of $Li_{1.2}Mn_{0.4-x}Ti_{0.4}D_xO_2$, wherein $0<x\leq 0.2$.

3. The lithium metal oxide of claim 2, wherein D is Cr.

4. The lithium metal oxide of claim 1 having a composition of $Li_{1.2}Mn_{0.3}Ti_{0.4}Cr_{0.1}O_2$ (LMTC01O).

5. The lithium metal oxide of claim 1 having a composition of $Li_{1.2}Mn_{0.2}Ti_{0.4}Cr_{0.2}O_2$ (LMTC02O).

6. The lithium metal oxide of claim 1 having a composition of $Li_{1.2}Ni_{0.2-x}Ti_{0.6-x}D_{2x}O_2$, wherein $0<x\leq 0.1$.

7. The lithium metal oxide of claim 6, wherein D is Cr.

8. The lithium metal oxide of claim 1 having a composition of $Li_{1.2}Ni_{0.1}Ti_{0.5}Cr_{0.2}O_2$ (LNTC02O).

9. The lithium metal oxide of claim 1, wherein D is Cr or Mo.

10. The lithium metal oxide of claim 1, wherein D is Cr.

11. A method for manufacturing a lithium metal oxide comprising a cation-disordered rocksalt structure having a general formula of $Li_{1.2}M_{0.8-x-y}M'_yD_xO_2$, wherein M is a redox-active transition metal selected from the group consisting of Mn and Ni, M' is a redox-inactive transition metal Ti, D is a metal dopant selected from the group consisting of V, Cr, Fe, and Mo, $0<x\leq 0.2$, and $y\geq 0.4$, the method comprising:

providing at least one lithium-based precursor;

providing a redox-active transition metal-based precursor;

providing a redox-inactive transition metal-based precursor;

providing a dopant metal-based precursor wherein the metal is D; and mixing the at least one lithium-based precursor, the redox-active transition metal-based precursor, the redox-inactive transition metal-based precursor, and the dopant metal-based precursor to form a mixture.

12. The method of claim 11, wherein:

the redox-active transition metal-based precursor is selected from the group consisting of NiO, $Ni_2O_3$, $MnO_2$, MnO, and $Mn_2O_3$.

13. The method of claim 11, wherein the at least one lithium-based precursor is selected from the group consisting of $Li_2CO_3$, LiOH, $Li_2O$, $Li_2SO_4$, LiCl, $LiNO_3$, and combinations thereof.

14. The method of claim 11, wherein the dopant metal-based precursor is selected from the group consisting of $V_2O_3$, $VO_2$, $Cr_2O_3$, FeO, $Fe_2O_3$, $MoO_3$, $MoO_2$, and $Mo_2O_3$.

15. The method of claim 11, wherein stoichiometric amounts of the at least one lithium-based precursor, the redox-active transition metal-based precursor, the redox-inactive transition metal-based precursor, and the dopant metal-based precursor are mixed, and wherein the at least one lithium-based precursor is added in up to 15% excess of a specified lithium composition.

16. The method of claim 11, wherein the redox-inactive transition metal-based precursor is $TiO_2$.

17. The method of claim 11, wherein D is Cr or Mo.

18. The method of claim 11, wherein D is Cr.

19. The method of claim 11, wherein the lithium metal oxide comprises a composition of $Li_{1.2}Mn_{0.4-x}Ti_{0.4}D_xO_2$, wherein $0<x\leq 0.2$, or a composition of $Li_{1.2}Ni_{0.2-x}Ti_{0.6-x}D_{2x}O_2$, wherein $0<x\leq 0.1$.

20. The method of claim 11, wherein the lithium metal oxide comprises a composition of $Li_{1.2}Mn_{0.3}Ti_{0.4}Cr_{0.1}O_2$ (LMTC01O), $Li_{1.2}Mn_{0.2}Ti_{0.4}Cr_{0.2}O_2$ (LMTC02O), or $Li_{1.2}Ni_{0.1}Ti_{0.5}Cr_{0.2}O_2$ (LNTC02O).

* * * * *